(12) United States Patent
Manousiouthakis et al.

(10) Patent No.: US 11,480,303 B2
(45) Date of Patent: Oct. 25, 2022

(54) GAS FUELING SYSTEMS AND METHODS WITH MINIMUM AND/OR NO COOLING

(71) Applicant: Vasilios I. Manousiouthakis, Los Angeles, CA (US)

(72) Inventors: Vasilios I. Manousiouthakis, Los Angeles, CA (US); Fernando Olmos, Los Angeles, CA (US)

(73) Assignee: VASILIOS MANOUSIOUTHAKIS, Los Angeles, CA (US)

( * ) Notice: Subject to any disclaimer, the term of this patent is extended or adjusted under 35 U.S.C. 154(b) by 0 days.

(21) Appl. No.: 17/071,906

(22) Filed: Oct. 15, 2020

(65) Prior Publication Data

US 2021/0116071 A1    Apr. 22, 2021

Related U.S. Application Data

(63) Continuation of application No. 15/905,547, filed on Feb. 26, 2018, now abandoned, which is a
(Continued)

(51) Int. Cl.
*F17C 5/06* (2006.01)
*F17C 13/02* (2006.01)
(Continued)

(52) U.S. Cl.
CPC ............... *F17C 5/06* (2013.01); *F17C 5/02* (2013.01); *F17C 13/02* (2013.01); *F17C 13/04* (2013.01);
(Continued)

(58) Field of Classification Search
CPC .... F17C 5/06; F17C 2221/012; F17C 13/026; F17C 2227/036; F17C 2227/0337
See application file for complete search history.

(56) References Cited

U.S. PATENT DOCUMENTS 5,370,159 A    12/1994 Price
5,409,046 A    4/1995  Swenson
(Continued)

FOREIGN PATENT DOCUMENTS

EP    0653585    5/1995
EP    1336795    8/2003

OTHER PUBLICATIONS

Korean Intellectual Property Office (KIPO), International Search Report and Written Opinion dated Dec. 1, 2016, related PCT international application No. PCT/US2016/049532, pp. 1-18, with claims searched, pp. 19-24.

*Primary Examiner* — Andrew D Stclair

(57) ABSTRACT

Gaseous fueling systems and methods are provided for dispensing fuel to a vehicle or container. The distribution systems speed up the filling process and may eliminate the use of expensive cooling systems required in the art. The methods utilize sequences of filling and emptying the vehicle gas storage tank to control the temperature of the gas inside the tank. The methods repeatedly dispense fuel to the vehicle fuel tank at a first flow rate and for a first period of time and remove fuel from the fuel tank at a second flow rate for a second period to maintain fuel temperature within a desired temperature range and until the vehicle fuel tank is filled to a desired level. In addition, the fill-up mass flowrate can be maximized to system capabilities so a fill-up can be can be completed in about one minute.

11 Claims, 9 Drawing Sheets

Related U.S. Application Data continuation of application No. PCT/US2016/049532, filed on Aug. 30, 2016.

(60) Provisional application No. 62/211,854, filed on Aug. 30, 2015.

(51) Int. Cl.
*F17C 13/04* (2006.01)
*F17C 13/08* (2006.01)
*F17C 5/02* (2006.01)

(52) U.S. Cl.
CPC ...... *F17C 13/08* (2013.01); *F17C 2205/0142* (2013.01); *F17C 2205/0326* (2013.01); *F17C 2205/0367* (2013.01); *F17C 2221/012* (2013.01); *F17C 2221/033* (2013.01); *F17C 2223/0123* (2013.01); *F17C 2223/036* (2013.01); *F17C 2225/0123* (2013.01); *F17C 2225/036* (2013.01); *F17C 2227/0337* (2013.01); *F17C 2227/0344* (2013.01); *F17C 2227/0348* (2013.01); *F17C 2227/047* (2013.01); *F17C 2250/032* (2013.01); *F17C 2250/0439* (2013.01); *F17C 2250/075* (2013.01); *F17C 2260/023* (2013.01); *F17C 2265/065* (2013.01); *F17C 2270/0171* (2013.01); *F17C 2270/0176* (2013.01); *F17C 2270/0178* (2013.01); *F17C 2270/0184* (2013.01)

(56) References Cited

U.S. PATENT DOCUMENTS

| | | | |
|---|---|---|---|
| 5,570,729 A | 11/1996 | Mutter | |
| 6,182,717 B1 * | 2/2001 | Yamashita | F17C 11/005 141/82 |
| 6,432,283 B1 | 8/2002 | Fairlie | |
| 6,810,925 B2 | 11/2004 | Graham | |
| 7,124,790 B2 | 10/2006 | Bushko | |
| 7,377,294 B2 | 5/2008 | Handa | |
| 7,406,987 B2 | 8/2008 | Takano | |
| 7,938,150 B2 | 5/2011 | Handa | |
| 8,210,214 B2 | 7/2012 | Casey | |
| 8,215,342 B2 | 7/2012 | Mclean | |
| 8,256,449 B2 | 9/2012 | Handa | |
| 8,286,670 B2 | 10/2012 | Faudou | |
| 8,365,777 B2 * | 2/2013 | Farese | F17C 5/007 141/4 |
| 2002/0075890 A1 | 6/2002 | Kim | |
| 2004/0182470 A1 | 9/2004 | White | |
| 2005/0287407 A1 * | 12/2005 | Bushko | H01M 8/04208 141/82 |
| 2008/0209916 A1 * | 9/2008 | White | F17C 7/02 62/48.1 |
| 2008/0302504 A1 | 12/2008 | Handa | |
| 2009/0107152 A1 | 4/2009 | Fischer | |
| 2011/0048576 A1 * | 3/2011 | Meisner | F17C 13/00 141/5 |
| 2013/0014854 A1 * | 1/2013 | Mori | B67D 7/348 141/1 |
| 2014/0110017 A1 * | 4/2014 | Gupta | F17C 5/007 141/4 |
| 2016/0273713 A1 | 9/2016 | Lee | |

* cited by examiner

GAS FUELING SYSTEMS AND METHODS WITH MINIMUM AND/OR NO COOLING

CROSS-REFERENCE TO RELATED APPLICATIONS

This application is a continuation of U.S. patent application Ser. No. 15/905,547 filed on Feb. 26, 2018, incorporated herein by reference in its entirety, which is a 35 U.S.C. § 111(a) continuation of PCT international application number PCT/US2016/049532 filed on Aug. 30, 2016, incorporated herein by reference in its entirety, which claims priority to, and the benefit of, U.S. provisional patent application Ser. No. 62/211,854 filed on Aug. 30, 2015, incorporated herein by reference in its entirety. Priority is claimed to each of the foregoing applications.

The above-referenced PCT international application was published as PCT International Publication No. WO 2017/040550 on Mar. 9, 2017, which publication is incorporated herein by reference in its entirety.

STATEMENT REGARDING FEDERALLY SPONSORED RESEARCH OR DEVELOPMENT

Not Applicable

BACKGROUND

1. Technical Field

The present technology pertains generally to gas dispensing systems and infrastructure and more particularly to gas refueling station systems and methods for efficiently refueling hydrogen gas or compressed natural gas to high pressure gas fuel tanks of gas powered vehicles without the need for high cost cooling systems.

2. Background Discussion

The development of new forms of transportation that utilize alternative fuel sources to oil, such as hydrogen gas to power fuel cells or compressed natural gas (CNG), also require the development of consumer refueling station infrastructures and efficient distribution methods. High pressure fuel tanks may be used in hydrogen powered vehicles to provide fuel to power fuel cells and increase range. This requires the transfer of gases at high pressure from a filling station tank to the vehicle fuel tank.

However, one significant problem with high pressure transfers is that the interior of the vehicle fuel tank heats up substantially as the tank pressure increases during the refueling process. As a consequence of the increased temperatures during fueling, the vehicle fuel tank cannot be completely filled to its capacity and therefore the range of the vehicle decreases. To compensate, some suggest filling the tank to pressures that exceed the designed pressure of the tank and initially overfill the tank. The overfilling of the vehicle fuel tank allows the mileage range of the vehicle to increase.

Another approach has been to use a slower flow rate in the refueling process to decrease the effect of the interior temperature increases in the vehicle fuel tank. However, significantly longer fueling times are required with a substantial reduction in the gas flow rate during refueling to avoid the interior heating.

Common gas filling stations have fill-ups that are characterized by a small mass flowrate of the gas, making the fill-up time last approximately 10 minutes for the case of hydrogen car storage vessels. Second, the gas being fed to the gas storage vessel must be cooled down to temperatures below about 273.15 K in order to feature a fast mass flowrate of the gas. For the case of a hydrogen car, typically the cooling temperature ranges from about 27.15 K to about 233.13 K allowing for a fill-up to last 3 minutes.

The pre-cooling of the fuel gasses to desired temperatures with conventional chillers can require a substantial amount of energy that becomes an important consideration in the overall cost of distribution. Accordingly, there is a need for gas fueling station systems and methods for refueling vehicle fuel tanks that reduces or eliminates the interior compression heating during refueling that is efficient and can substantially avoid the expense of high capacity cooling systems.

BRIEF SUMMARY

This disclosure describes innovative systems and methods for filling-up and emptying gas storage vessels in a safe and efficient manner. For the purpose of illustrating the systems and methods, several embodiments are presented based on the fill-up of a hydrogen vehicle through a hydrogen fueling station. Similar fill-up methodologies can be applied to other gases such as compressed natural gas (CNG) and many others, however.

As an example, the fill-up of the fuel tank of a hydrogen fuel cell vehicle with high pressure gaseous hydrogen in a safe and efficient manner generally requires that the fill-up takes place in less than about one minute and that the gas temperature stays below about 85° C., which is the maximum temperature Type IV hydrogen tanks can withstand.

Two main advantages of the present technology are that it can speed up the fill-up process in a safe manner and may eliminate the use of an expensive cooling system that is commonly employed in the fill-up process. The technology also encompasses a methodology of filling-up and emptying the gas storage vessel as a way to control the temperature of the gas inside the vessel, as well as the temperature of the vessel itself. Furthermore, the fill-up mass flowrate can be at the maximum allowed by the ratings of the materials and the gas pressures present in the fill-up system and gas storage vessel; thus, a fill-up performed according to the present technology can be completed in less than about one minute.

One such embodiment is a system design that uses a single gas source tank, a valve, a cooling system, a gas storage vessel to be filled, and a gas dumping tank. In this embodiment, the methodology employs a strategy where the gas storage vessel is filled-up until the temperature of the gas inside the vessel reaches a temperature limit. Thereafter, the gas storage vessel is partially emptied until the temperature of the gas inside the vessel reaches another low temperature limit while the gas being released is dumped into the gas dumping tank. These two actions, filling-up and emptying, represent one step in a multistep fill-up process referred to as a "ladder" fill-up process. The fill-up is concluded once the desired pressure is reached while the temperature limit is never violated. In other embodiments, the system can operate either with or without a gas cooling system. When a cooling system is used the coolant that is employed and associated coolant temperatures can vary widely. Common refrigerants can be employed, including water and air. The commercial application of the technology can occur in many industries, including, but not limited to: the fill-up of hydrogen vehicles (cars, buses, trucks, etc.); the fill-up of natural gas vehicles (cars, buses, trucks, etc.); and the fill-up of high pressure storage tanks/cylinders.

The basic components of the inventive system include a hydrogen fueling station storage tank, a dispenser (which encloses an isenthalpic (Joule-Thomson) valve (referred as J-T valve), a controller, an optional cooling device), a vehicle storage tank that is equipped with either an inlet and an outlet or with only one inlet that has a two-way valve connected to it, a second J-T valve, a hydrogen fueling station dumping tank, and a plurality of valves and pipes. The system components are considered to be thermally insulated so that no heat transfer can take place between any component of the system and the environment at any given point in time. If heat transfer is allowed, then the fill-up process can only be further accelerated. In that sense, the no heat transfer case considered here represents the worst case scenario in terms of fill-up time. The system designs can also accommodate different numbers of components depending on the assumptions, specifications, and requirements of the designs. The systems are also flexible in order to be implemented in a variety of situations.

The hydrogen fueling station storage tank is assumed to be full of hydrogen at high pressure, typically 1000 bar, and provides the hydrogen that will be fed into the storage tank of the vehicle. Hydrogen flows from the station storage tank into the dispenser through controlled valves. At the dispenser, the hydrogen coming at high pressure from the station storage tank passes through a J-T valve, which restricts the flow of hydrogen so that there is pressure drop across the valve. Due to the thermodynamic properties of hydrogen, it will increase in temperature and decrease in pressure as it flows through the valve. The J-T valve output high temperature hydrogen can be treated in different ways: 1) it can flow directly to the vehicle tank; 2) it can be passed through a cooling device to lower the temperature to 273.15 K (ice water); or 3) it can be passed through an air cooler (either force convection or free convection of air) to lower the temperature to 298.15 K or to an ambient temperature below 298.15 K.

The controller inside of the dispenser is connected to all the system parts in order to implement the fuel filling methodology. Hydrogen is dispensed from the dispenser into the vehicle fuel storage tank, which is assumed to have a minimum hydrogen pressure of 10 bars. However, the conventional vehicle storage tank has been modified. The modification comprises adding the capability of the tank to be emptied through two ways: 1) addition of an outlet to the vehicle storage tank so it is equipped with one inlet and one outlet, or 2) the addition of a two-way valve that is connected to the inlet that conventional tanks typical have. Finally, the hydrogen fueling station has a dumping tank, which is a tank at the station that will receive hydrogen being emptied from the vehicle storage tank after it flows through the second J-T valve. In one embodiment the station storage tank, that feds hydrogen to the vehicle tank, has a hydrogen pressure greater than that inside the vehicle tank in order to allow for the natural flow of hydrogen due to pressure differences between the two tanks. In addition, the station dumping tank may always maintain a pressure that is lower than that in the vehicle storage tank in order to allow the emptying of the vehicle tank by hydrogen flowing from the vehicle tank to the station dumping tank naturally due to the pressure differences between the tanks.

The methods may rely on two thermodynamic phenomena within the context of this general fueling system. The two phenomena are: 1) the flow of hydrogen due to pressure differences without the use of compressors, and 2) the intrinsic heating (cooling) of hydrogen due to a compression (expansion) process. The methodology applies without regard to the method of cooling used after the J-T valve at the dispenser.

The methodology can be best described as a "ladder fill-up process" that involves the filling-up and emptying of the vehicle storage tank as a way to control hydrogen's temperature inside the tank between a minimum of 298.15 K and a maximum of 358.15 K, which is the temperature limit of current hydrogen storage tanks for vehicles. The first step of the ladder fill-up process involves the fill-up of the vehicle storage tank until the temperature of the hydrogen inside of it reaches 358.15 K due to compression. The following step comprise emptying some of the hydrogen accumulated in the vehicle storage tank during the first step in order to get the temperature the rest of the hydrogen inside the vehicle storage tank to 298.15 K by expansion.

Furthermore, the methodology guarantees that final mass and pressure of hydrogen inside the vehicle storage tank after the emptying process is greater than the mass and pressure of hydrogen at the end of the fill-up step. Then, these two steps of fill-up and emptying the vehicle tank are repeated until a final fill-up step that accumulates enough hydrogen mass inside the vehicle tank to a pressure of preferably about 700 bar (or 350 bar depending on the hydrogen fuel cell car generation) and a temperature below 358.15 K.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawings which are for illustrative purposes only.

DETAILED DESCRIPTION

Referring more specifically to the drawings, for illustrative purposes, embodiments of the methods and resulting structures are generally shown. Several embodiments of the technology are described generally in FIG. 3 through FIG. 12 to illustrate the systems and methods for fast dispensing of gaseous fuels without overheating the dispensing system. It will be appreciated that the methods may vary as to the specific steps and sequence and the devices may vary as to structural details without departing from the basic concepts as disclosed herein. The method steps are merely exemplary of the order that these steps may occur. The steps may occur in any order that is desired, such that it still performs the goals of the claimed technology.

The systems and methods of the present invention provide for filling a fuel storage vessel in a safe and efficient manner. Commonly used fuels to which this invention is applicable are hydrogen and natural gas. As an example, the fill-up of the fuel tank of a hydrogen fuel cell vehicle with high pressure gaseous hydrogen in a safe and efficient manner requires that the fill-up last less than one minute and that the gas temperature stays below 85° C., which is the maximum temperature Type IV hydrogen tanks can withstand.

Figure 1:
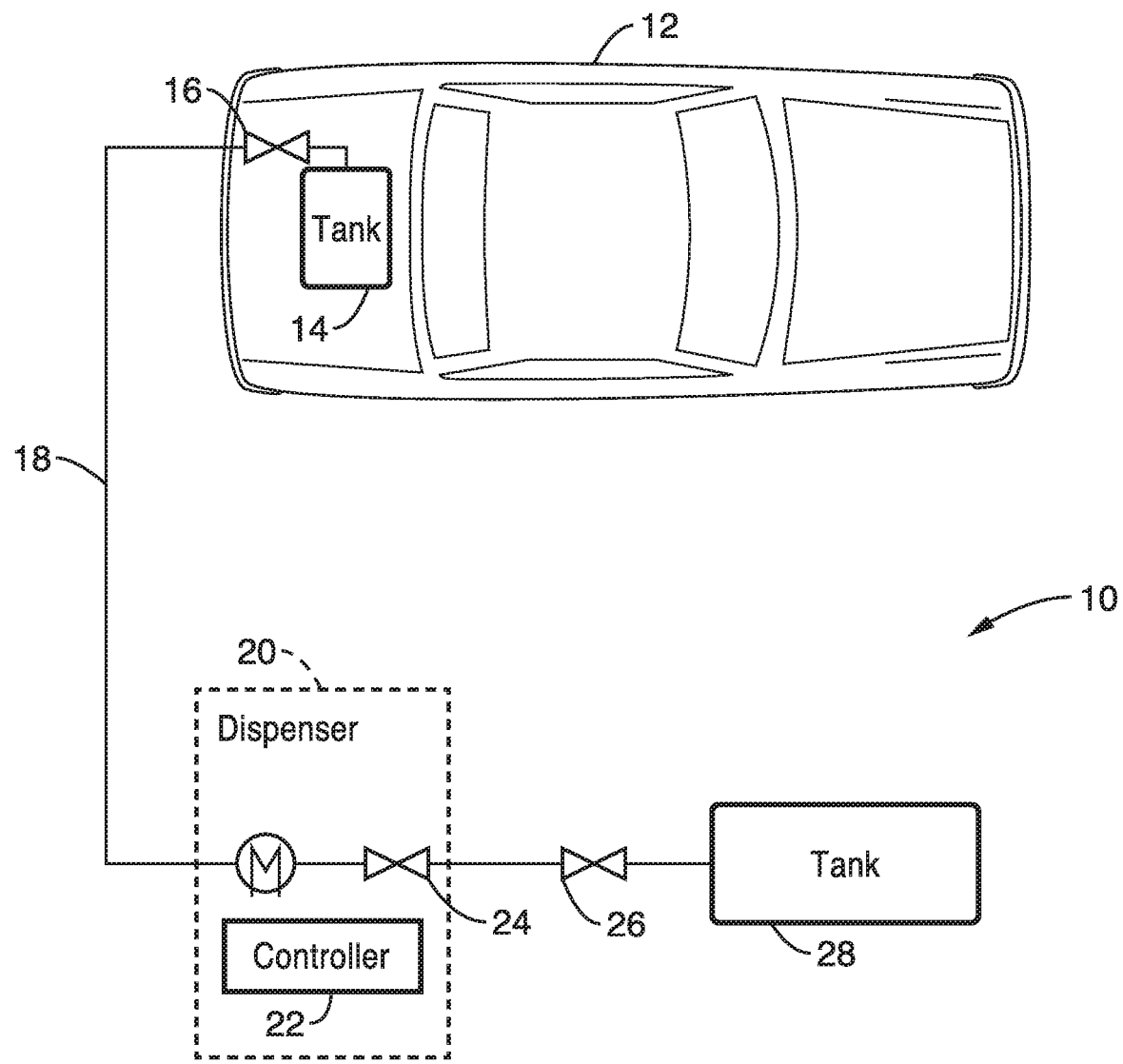
FIG. 1 is a schematic representation of a conventional gaseous fueling station known in the art with a single fuel storage tank and dispenser used as a benchmark for comparison.

For purposes of comparison, a conventional dispensing system 10 for filling a hydrogen or natural gas tank 14 of a hydrogen fueled car 12 is shown in FIG. 1 as a benchmark. Conventional hydrogen fuel cell car dispensing stations 10 known in the art have a slow hydrogen flowrate and a pre-cooling step, for 700 bar vehicles, where the fill-up lasts approximately 10 minutes. This is done to ensure that the temperature of the hydrogen inside of the vehicle tank stays below 358.15 K.

The tank (T2) 14 of the car 12 that is in need of refueling has an intake valve 16 that is coupled to a fuel dispenser of dispensing station 10 with a hose 18. As shown schematically in FIG. 1, the dispensing station has chiller 20, a controller 22 and a Joule-Thomson valve 1 (V1-JT) 24. The JT valve 24 is coupled to a station storage tank (T1) 28 through a gate (on/off) valve 26. Valve 16 and valve 26 (V1-G, V2-G) are both (on/off) valves corresponding to T1 and T2, respectively that can be controlled by controller 22 or opened manually. The chiller 20 is located after the J-T valve 24 in the flow path from the filling station tank 28. Typical fueling stations only have a main valve that needs to be open to allow flow from the dispenser to the vehicle tank. The temperature of the hydrogen output by the chiller is typically kept at a constant at 273.15 K. The system components are insulated, with zero heat transfer allowed between the system and the environment, except for the vehicle storage tank, T2.

The benchmark filling process conditions for filling the tank 14 (T2) of the car 12 are illustrated in Table 1. It was assumed that the Hydrogen mass flowrate was 0.006 kg/s and the total time of filling is 10 min=600 s. Tank T2 volume capacity is 0.108 m$^3$ and the Tank (T1) volume capacity is six times the volume capacity of T2, 0.648 m$^3$. The process conditions in Table 1 indicates that the fill-up is done in 10 minutes and the initial and final pressure, temperature, and mass of hydrogen inside tanks (T1) and (T2). The conditions in tank 28 (T1) decrease as it emptied itself to fill-up (T1) while (T2) is filled-up until it reaches 700 bar and a temperature (351.97 K below the maximum allowable of 358.15 K.

Figure 2:
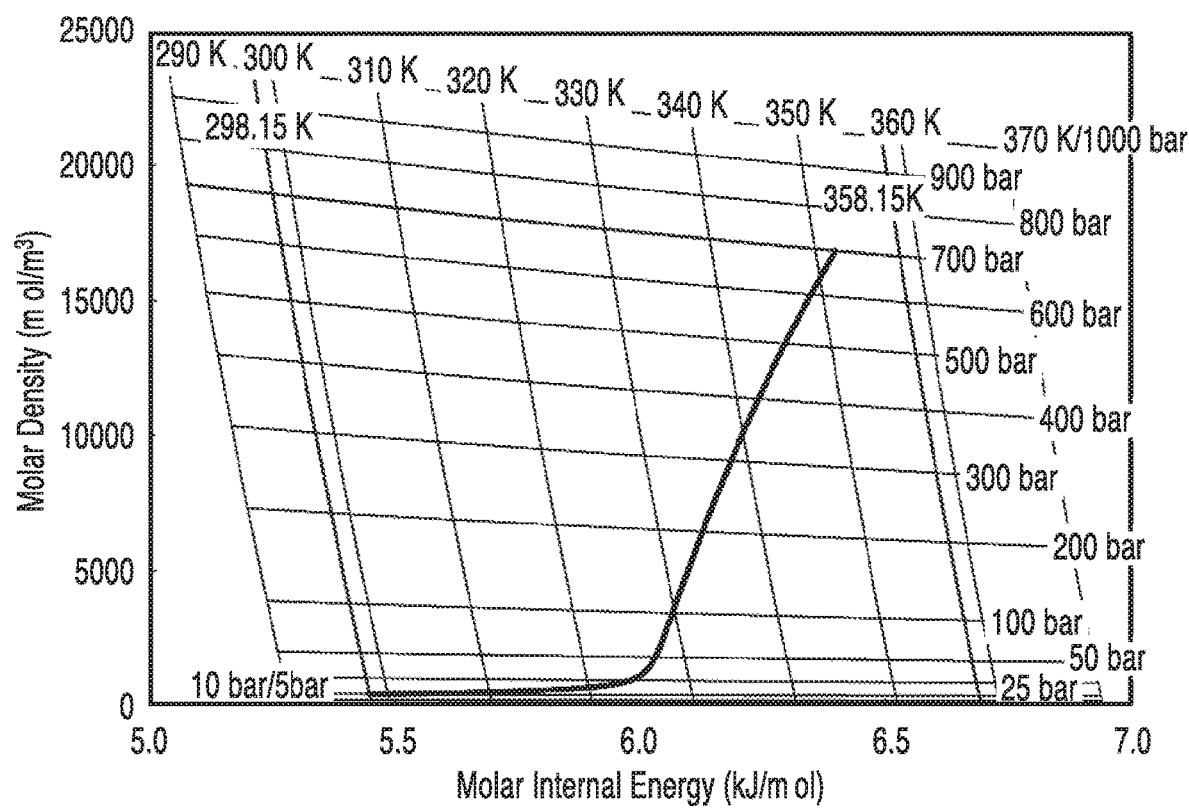
FIG. 2 is a thermodynamic diagram showing the evolution of hydrogen inside of the fuel storage tank during the fill-up process in the prior art system shown in FIG. 1.

The thermodynamic plot shown in FIG. 2 shows the evolution of hydrogen inside of (T2) during the fill-up process. When the amount of mass accumulated inside (T1) is relatively small (beginning of the process with pressures below 25 bar), all properties increase slightly. However, after the mass accumulated inside of (T1) passes 50 bar, all properties increase abruptly until (T1) is completely filled.

The conventional system shown in FIG. 1 and FIG. 2 are presented as a benchmark for comparison with the various embodiments of the technology of different complexities are shown in FIG. 3 through FIG. 12. Several embodiments of the fill-up systems and methods are described, and illustrate the large array of possible embodiments that should become clear to one skilled in the art.

The general principles behind the systems and methods of the present technology, the following illustrations and embodiments of the technology are based on the fill-up of a hydrogen vehicle through a hydrogen fueling station. Similar fill-up methodologies can be applied to other gases such as compressed natural gas (CNG) and many others. These examples of the technology invention describe the design of a gaseous hydrogen fueling station that implements a novel fill-up process of hydrogen fuel cell vehicles. Generally, three main features distinguish the fill-up process: 1) minimum or no pre-cooling of hydrogen; 2) a reduction or elimination of the capital cost of a cooling system depending on its coolant use (refrigerant, water, air); and 3) the fill-up process can be finished in less than one minute.

The basic components of the gas dispensing system illustrated in Example 1 through Example 5 are: 1) a hydrogen fueling station with one or more station storage tanks, a dispenser which encloses an isenthalpic (Joule-Thomson) valve (i.e. a J-T valve), a controller, and a cooling device; and 2) a vehicle fuel tank that is equipped with either an inlet and an outlet or with only one inlet that has a two-way valve connected to it, a second J-T valve, a hydrogen fueling station dumping tank, and a plurality of valves and pipes.

The system components are preferably thermally insulated so no heat transfer can take place between any component of the system and the environment at any given point in time. The general system can accommodate different numbers of these components depending on the assumptions, specifications, and requirements; the system is flexible to change in order to be implemented in a variety of situations.

The hydrogen fueling station storage tank in the various embodiments described in the examples below is assumed to be full of hydrogen at high pressure, typically 1000 bar (but could be set to any given pressure), and produced and transported by conventional sources. The purpose of this fueling station storage tank is to provide the hydrogen that will be fed into the vehicle's fuel storage tank. Hydrogen flows from the station storage tank into the dispenser, which is a part of the system that houses other components.

At the dispenser, the hydrogen coming at high pressure from the station storage tank or tanks passes through a J-T valve, which restricts the flow of hydrogen so that there is pressure drop across the valve. Due to the thermodynamic properties of hydrogen, it will increase its temperature and decrease its pressure as it flows through the valve. The J-T valve output of high temperature hydrogen can be treated in different ways: 1) it can flow directly to the vehicle tank; 2) it can optionally be passed through a cooling device to lower the temperature to 273.15 K (ice water); or 3) it can optionally be passed through an air cooler (either force convection or free convection of air) to lower the temperature to 298.15 K (or ambient temperature below 298.15 K).

The controller inside of the dispenser is connected to all the system parts in order to implement the invention's fill-up methodology. Once hydrogen is output from the dispenser, it is fed into the vehicle storage tank, which is assumed to have a minimum hydrogen pressure of 10 bars.

However, according the methodology, the vehicle storage tank requires a slight modification to conventionally used tanks in hydrogen fuel cell vehicles. The modification comprises adding the capability of the tank to be emptied through two ways: 1) the addition of an outlet to the vehicle fuel storage tank so that it is equipped with one inlet and one outlet, or 2) addition of a two-way valve that is connected to the inlet tanks typically present in the vehicle. Finally, the hydrogen fueling station requires a dumping tank, which is a tank at the station that will receive hydrogen being emptied from the vehicle storage tank after it flows through the second J-T valve in some embodiments.

The inventive methods also manipulate two thermodynamic phenomena in various adaptations of the system. The two phenomena are: 1) the flow of hydrogen due to pressure differences without the use of compressors, and 2) the intrinsic heating or cooling of hydrogen due to a compression or an expansion process. The methodology applies without regard to the method of cooling used after the J-T valve at the dispenser or if no cooling is performed at all.

The methodology can be generally described as having a ladder or step fill-up process" that involves the filling-up and emptying of the vehicle fuel storage tank as a way to control temperature of the hydrogen inside of the tank to be between a minimum of 298.15 K and a maximum of 358.15 K or 85° C., the temperature limit conventional hydrogen storage tanks for vehicles.

The first step of the ladder fill-up process preferably involves the fill-up of the vehicle fuel tank until the temperature of the hydrogen inside of it reaches 358.15 K due to compression. The next step generally comprises emptying some of the hydrogen that has accumulated in the vehicle fuel tank during the first step in order to get the temperature of the rest of the hydrogen inside the vehicle fuel tank to 298.15 K by expansion. Furthermore, the methodology guarantees that final mass and pressure of hydrogen inside the vehicle fuel storage tank after the emptying process is greater than the mass and pressure of hydrogen at the end of the fill-up step.

Then, these two steps of fill-up and emptying of the vehicle fuel tank are repeated until a final fill-up step that accumulates enough hydrogen mass inside of the vehicle fuel tank to a pressure of 700 bar and to a temperature of below 358.15 K. Alternatively, the final pressure may be brought to 350 bar if the hydrogen from the tank is to be used in a vehicle with fuel cell car power generation.

The methodology also provides that the station storage tanks that feed hydrogen to the vehicle fuel tank have a hydrogen pressure greater than the pressure that is currently inside the vehicle fuel tank in order to allow for the natural flow of hydrogen due to pressure differences between the two tanks. In this way, a compressor is not required to be included in the system.

Likewise, the station dumping tank is configured to always maintain a pressure lower than that in the vehicle fuel storage tank in order to allow the emptying of the vehicle tank by hydrogen flowing from the vehicle tank to the station dumping tank naturally due to the pressure differences between the tanks. Additionally, the methodology assumes that the hydrogen coming out of the vehicle tank during the emptying step has the same thermodynamic properties as the hydrogen accumulated inside the vehicle fuel storage tank, also known as the continuous stirred-tank reactor (CSTR) assumption.

It can be seen that systems of different complexities and capabilities can devised using these principles and the system design elements. Examples of five different embodiments are presented to illustrate the range of system designs and methods for filling-up a hydrogen fueled car cars based on different desired assumptions, specifications, and requirements. These examples can be compared to a benchmark case of a conventional hydrogen fill-up process to illustrate the performance capabilities of the systems over the art.

In the descriptions below, for each example a system components diagram is presented along with two tables: the process conditions and the valves states. Some tables identify the conditions of each step and indicate generally whether it is a tank emptying step (E) or a tank filling step (F).

System configuration diagrams for each example are presented, along with two tables showing hydrogen's properties inside every storage tank at all ladder fill-up process steps, thermodynamic plots with a graphical representation of the ladder fill-up process, and their description. However, some diagrams may apply to more than one embodiment.

The technology may be better understood with reference to the accompanying examples, which are intended for purposes of illustration only and should not be construed as in any sense limiting the scope of the present invention as defined in the claims appended hereto.

Example 1

In order to demonstrate the concepts of the system and methods, a filling system with a constant enthalpy feed to the vehicle fuel tank was designed that eliminated the need for the cooling subsystem typically required in conventional filling systems.

Figure 3:
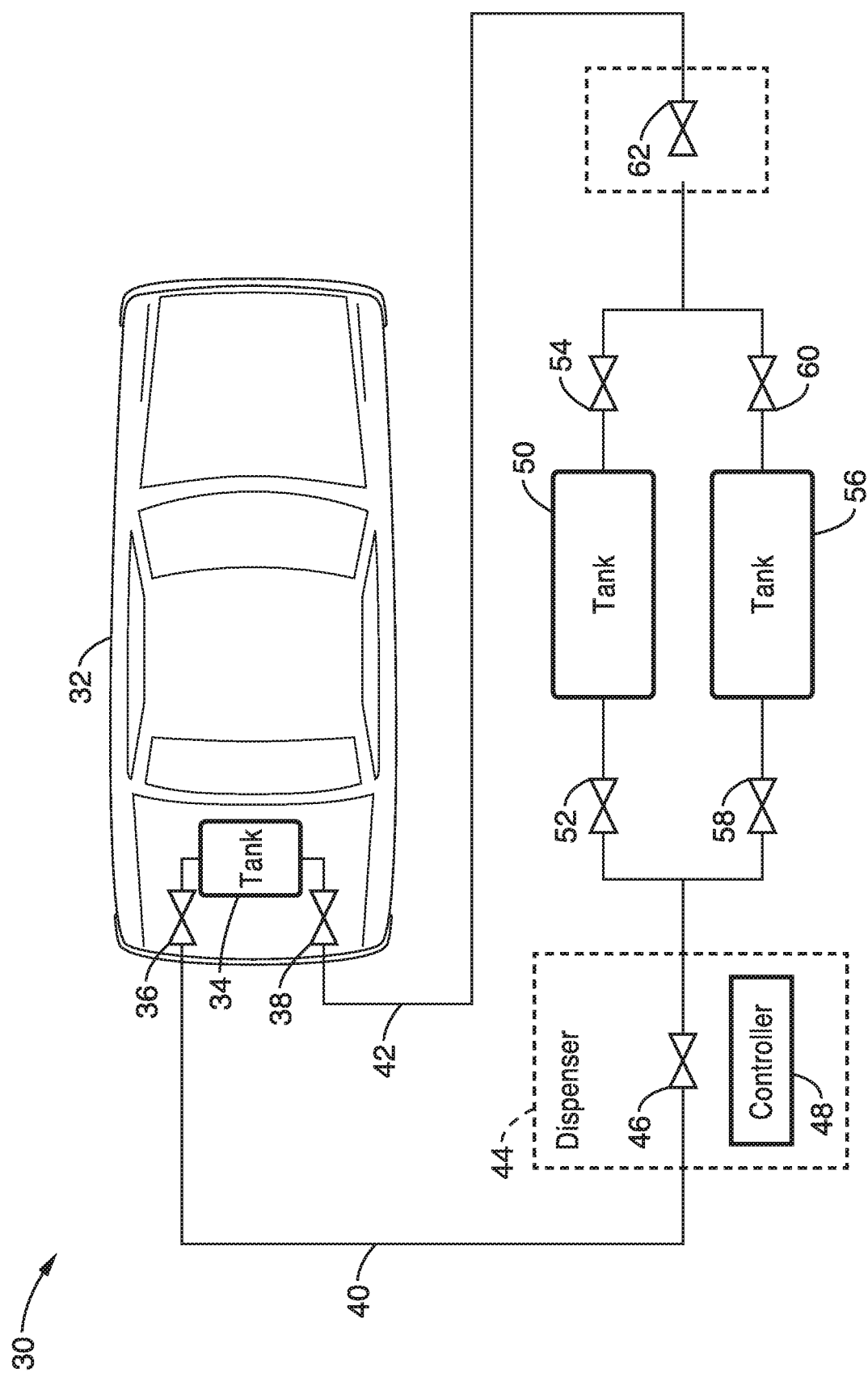
FIG. 3 is a system components diagram of one embodiment of the technology of a station with fuel storage tank, dump tank, dispenser subsystem, and dumping subsystem.

Turning now to FIG. 3, one preferred embodiment 10 of a hydrogen production system according to the technology is generally shown to illustrate one suitable system structure. The states of the valves in the system during each process step are found in Table 1 and the process steps and conditions are found in Table 2 to simplify the descriptions.

In the illustration of FIG. 3, the gaseous hydrogen powered vehicle 32 has a fuel tank 34 (T3) with an input valve 36 and an output valve 38 and each valve is coupled to fueling lines of the hydrogen fueling station. The input line 40 from the station dispenser subsystem 44 is coupled to the input valve 36 of the car fuel tank and the output valve 38 is coupled to a dumping line 42 that returns fuel to the dumping subsystem of the station.

The dispensing subsystem 44 has a Joule-Thomson valve 46 designated (V1-JT) that is coupled to dispenser line 40. The first JT valve 46 is controlled by a controller 48 that is capable of sensing temperatures and pressures of the system lines and tanks. The JT valve 46 of the dispenser subsystem 44 receives fuel from the station fuel tanks through on/off valves controlled by the controller. The station fuel tanks include the fueling station storage tank (T1) 50 and the hydrogen fueling station dumping tank (T2) 56. The station storage tank 50 is coupled to the dispenser subsystem 44 through a controlled on/off valve 52 and the station dumping tank 56 is also coupled to the dispenser subsystem 44 through a controlled on/off valve 58.

The dumping subsystem has a Joule-Thomson valve 46 designated (V2-JT) that is coupled to dispenser line 42. Fuel from the car fuel tank 34 through line 42 passed through this second JT valve 62 and can be dumped to station storage tank 50 through controlled inlet on/off valve 54. Or dumped fuel from car tank 34 (T3) that is passed through the second JT valve 62 can be dumped to the station dumping tank 56 through controlled inlet on/off valve 60.

In the embodiment shown in FIG. 3, the system components are preferably insulated, with zero heat transfer allowed between the system and the environment. Station storage tank 50 (T1) is assumed to have an infinite volume capacity in order to keep its outlet pressure (1000 bar) and temperature (298.15 K) constant. Car fuel tank (T3) 34 has a volume capacity is 0.108 m$^3$. Station dumping tank (T2) 56 is assumed to have a volume capacity that is ten times greater than (T3), so has a volume of 1.08 m$^3$. In addition, no chiller or cooling device is included in the design.

The mass flowrate and total process time are arbitrary according to the assumptions of the process previously mentioned. Therefore, the ladder fill-up process can last approximately 30 seconds by selecting the appropriate mass flowrate. In this embodiment, hydrogen released by the fueling station storage tank 50 is kept at a constant pressure and temperature, so when hydrogen flows through the isenthalpic valve (JT valve 46) in the dispenser 44 the hydrogen's enthalpy stays constant and the vehicle tank (T3) 34 is fed constant enthalpy hydrogen from the station storage tank (T1) 50. This fill-up is completed by the ladder fill-up process shown in the steps of Table 1 and Table 2.

Figure 4:
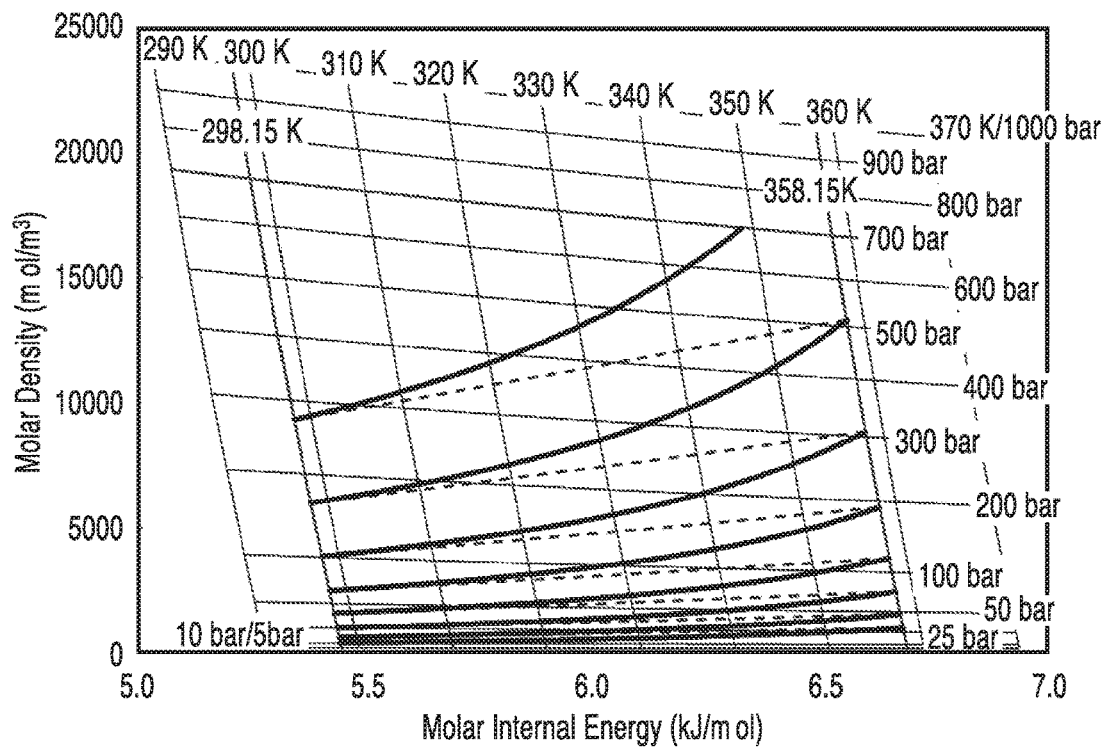
FIG. 4 is thermodynamic diagram of the filling process in the embodiment of the system shown in FIG. 3.
Figure 5:
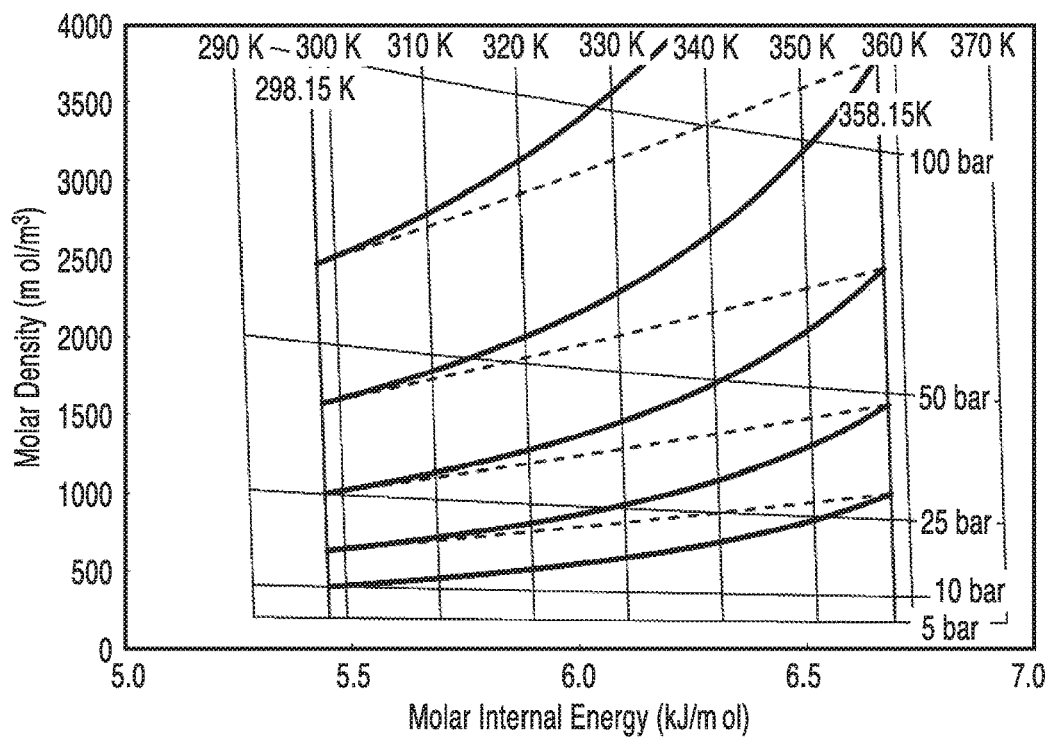
FIG. 5 is a thermodynamic diagram of showing detailed process curves from the diagram of FIG. 4 for clarity.

The addition of the valve states in Table 1 is due to the fact that the process requires the use of several valves which, depending on the process step, are either opened or closed. Two figures are shown for the fill-up process strategy. The graph shown in FIG. 4 is the overall depiction of the process in a thermodynamic diagram. However, the processes curves at the bottom of the figure are too close to each other making them hard to read. Therefore, a second figure with a close-up/zoom of the lower processes curves shown in FIG. 5 is provided for clarity.

In the fill-up process described below and in Table 1 and Table 2 in the context of FIG. 3, the outlet gate valve of 52 of station storage tank 50 is designated valve 1 (V1-G) and outlet gate valve 58 of the dumping tank 56 is designated valve 2 (V2-G). The inlet valve 36 of car fuel tank 34 is designated (V3-G) and the outlet gate valve 38 is designated (V4-G). The input gate valve 54 to the station storage tank 50 is designated (V5-G) and the input gate valve 60 to the dumping tank is designated (V6-G).

Referring now to Table 1 and Table 2, the thermodynamic properties inside tanks T1, T2, and T3 are indicated for each step. Table 1 also shows the state of every valve depending on the ladder step (filling-up or emptying) in conjunction with the steps identified in Table 2. The process conditions tables and thermodynamic plots show that the fill-up process strategy comprises 7 ladder steps 1) step is a filling-up process followed by an emptying process) plus 1 filling-up process for hydrogen inside T3 to reach 700 bar and 348.86 K.

As seen in the steps of the tables, the steps show the sequence of dispensing and removing fuel from the car fuel tank 34 simultaneously until the fuel storage tank 34 is filled to a desired level or sequentially separate until the fuel storage tank is filled to a desired level steps are performed. The process includes steps of removing fuel from the storage tank at a second flow rate, for a second period of time, until the temperature of the fuel inside the vehicle storage tank 34 reaches a low/minimum allowable temperature limit and until the temperature of the fuel inside the vehicle storage tank reaches a minimum of about 298.15 K. The first and second flow rates are selected to maintain fuel temperature within a desired temperature range.

In addition, the thermodynamic charts plot molar density (mol/m$^3$) as a function of molar internal energy (kJ/mol) shown in FIG. 4 and FIG. 5. It can be seen in these figures, however, that the curve is inside of a plane that is made out of isobars and isotherms that allows analysis of the curve as it evolves with respect to pressure and temperature. There are three specifications that limit the space in which the curve can evolve: 1) the 700 bar isobar (maximum allowable pressure in the vehicle tank); 2) the 298.15 K isotherm (the minimum allowable temperature for hydrogen inside the vehicle tank; 3) the 358.15 K isotherm (the maximum allowable temperature for hydrogen inside the vehicle tank. These thermodynamic charts and illustrates the ladder fill-up process strategy in its entirety as well as shows an extrapolation of the first 4 steps of the fill-up process strategy.

Example 2

Figure 6:
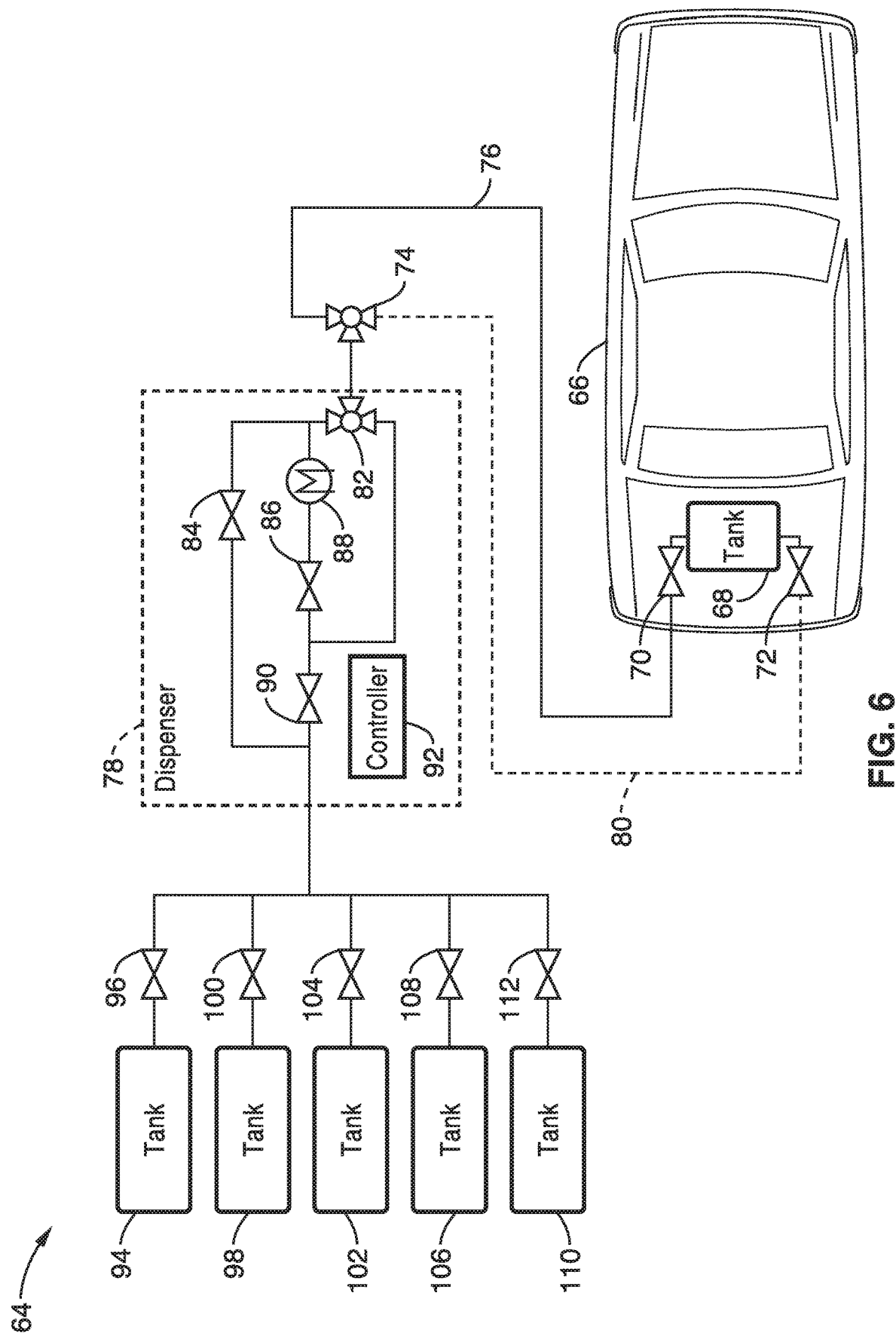
FIG. 6 is a system components diagram of a second embodiment of the technology of a station with multiple fuel storage tanks, a dump tank and dispenser subsystem.

To further demonstrate the concepts of the system and methods, an alternative embodiment of a filling system with multiple station fuel filling tanks and a single dispensing subsystem with a constant temperature feed to the vehicle tank was designed and is illustrated in FIG. 6. The system 64 shown in FIG. 6, has a bank of station hydrogen storage tanks designated (T1) through (T4); a hydrogen fueling station dump tank designated (T5) and a vehicle fuel tank designated (T6). The system has a dispenser and fueling lines that couple to the vehicle. In this embodiment, the hydrogen fueling station has a bank of five tanks where four of them are filled to different pressures, and one tank is left almost empty to work as a dumping tank. The pressure and temperature of the hydrogen inside of the station tanks are allowed to vary according to the ladder fill-up process. An optional chiller is included in the system to output constant temperature hydrogen to be fed in to the vehicle tank.

The system shown in FIG. 6, has a bank of station hydrogen storage tanks designated (T1) through (T4); a hydrogen fueling station dump tank designated (T5) and a vehicle fuel tank designated (T6). The system has a dispenser and fueling lines that couple to the vehicle.

In the system components diagram of FIG. 6, the hydrogen gas fueled car 66 has a vehicle fuel tank 68 that has a fuel tank input gate valve 70 and a fuel tank output gate valve 72. The input gate valve 70 of the fuel tank 68 is coupled to the dispenser through an input line 76 and the output gate valve 72 is also coupled to the dispenser 78 through a return line 80 and a compound dispenser output gate valve 74. The dispenser output gate valve 74 is coupled to another compound gate valve 82 that is part of the subsystem of dispenser 78 for metering fuel during the sequence of process steps for filling the fuel tank 68 of vehicle 66.

The dispenser 78 in this embodiment has a number of gate valves for moving fuel to and from the bank of station tanks to the vehicle fuel tank 68 controlled by a controller 92. The dispenser 78 has a chiller 88 to regulate the fuel temperature and the system preferably has temperature sensors in the tanks and lines that are sensed by the controller 92. A Joule-Thomson valve 86 designated (V1-JT) is coupled to the chiller 88 output line. The dispenser 78 has a second gate valve 90 that permits a variety of transfer routes through the dispenser 78, both through the chiller 88 and bypassing the chiller as well as the Joule-Thomson valve 86.

The dispenser 78 is also fed from a bank of fuel storage tanks. In this embodiment, station storage tank (T1) 94 has a controlled gate valve 96 that is coupled to the dispenser subsystem and controller 92. Likewise, tank (T2) 98 with gate valve 100; station tank (T3) 102 with gate valve 104; station tank (T4) with gate valve 108 are coupled to the dispenser 78 and controlled by controller 92. Dump tank (T5) 110 with gate valve 112 are also connected to the dispenser 78 through the main connection and gate valve 112 is controlled by the controller 92.

The vehicle fuel tank (T6) 68 preferably has a volume capacity of about 0.108 m$^3$ and each of tanks (T1) through (T5) in the bank are assumed to have a volume capacity four times greater than (T6), so have a volume of 0.432 m$^3$. The pressures in tanks T1-T5 in this example were (T1)=100 bar; (T2)=400 bar; (T3)=1000 bar; (T4)=1000 bar; (T5)=10 bar. The initial temperature of tanks T1-T5 was 298.15 K. The Hydrogen conditions in T1-5 were allowed to change according to the ladder fill-up process strategy of this embodiment of the system.

The system components are insulated, and assumed to have zero heat transfer allowed between the system and the environment. The chiller 88 is located after the J-T valve 86 of the dispenser 78 subsystem coupled to the vehicle 66. The temperature of the hydrogen output by the chiller is preferably constant at approximately 273.15 K. Hydrogen mass flowrate: 0.317 kg/s and a total filling time of approximately 30.03 sec.

Table 3 shows the state of every valve depending on the ladder step (filling-up or emptying). In the system shown in FIG. 6, the gate valve 96 from tank (T1)94 of the bank of tanks (T1)-(T5) is designated (V1-G). Likewise, gate valve 100 from tank (T2) 98 was designated (V2-G) and tank gate valve 104 was designated (V3-G); tank gate valve 108 was designated (V4-G); and dump tank gate valve 112 was designated (V5-G) as seen in Table 3.

The gate valves in the dispenser 78 were also designated. The filler gate valve 90 was designated (V6-G) and bypass gate valve 84 was labeled (V7-G) in Table 3. The dispenser 78 in this embodiment also has two three-way valves and valve 82 was designated (V8-G) and the corresponding valve 74 was designated (V9-G). In Table 3, the three way valve (V8-G) 82 has up, right and down line notations. The (V8-G) up line is the line connected to gate valve (V7-G) and the right line is connected to the second gate valve 74 through the (V9-G) left line. Likewise, the (V9-G) valve 74 has an up line connected to line 76 to tank 68 and a down line 80 also connected to tank 68. Vehicle fuel tank gate valve 70 was designated (V10-G) and gate valve 72 was designated (V11-G). The gate valves (V1-11) have two conditions: 1) an on condition where the flow is unrestricted, i.e. no pressure drop across the valve and 2) an off condition where there is no flow allowed through the valve. Similarly, the Joule-Thomson valves (VX-JT) have two conditions: 1) an on condition where flow is restricted, i.e. there is pressure drop across the valve, and 2) an off condition where there is no flow allowed through the valve.

Figure 7:
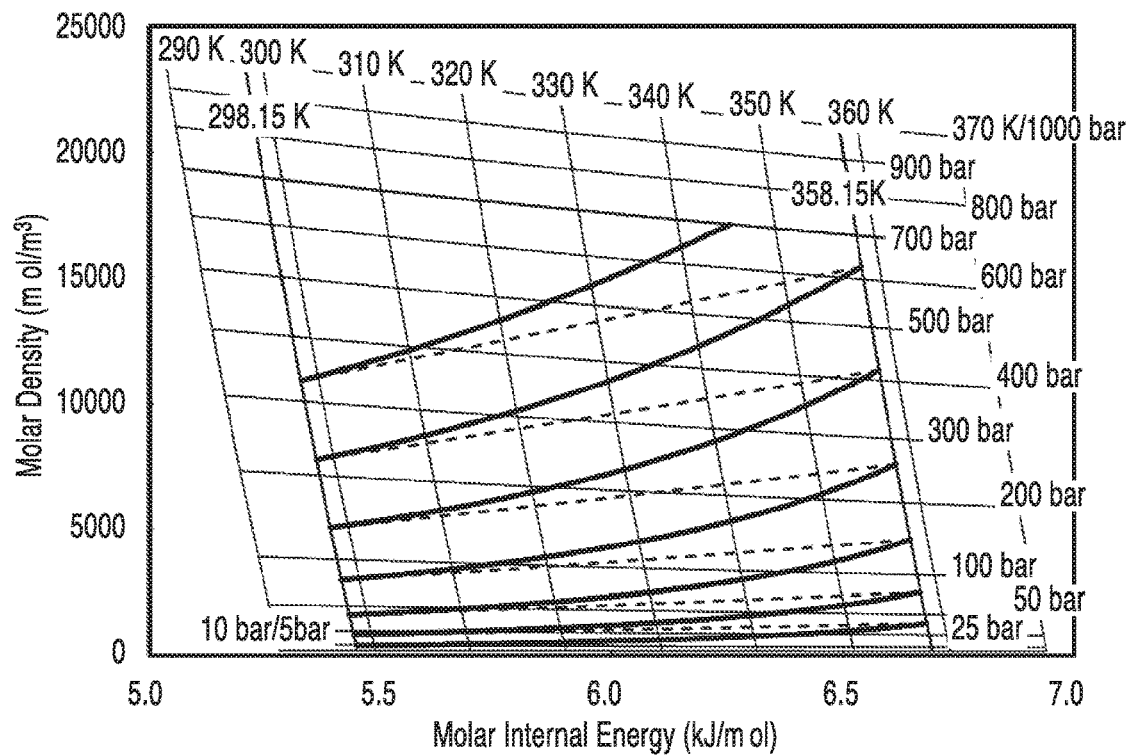
FIG. 7 is thermodynamic diagram of the filling process in the embodiment of the system shown in FIG. 6.

The fill-up process is shown in Table 3 shows the state of every valve depending on the ladder step and whether the tank is being emptied (out) or filled (in). Table 4 shows the thermodynamic properties inside tanks T1-G to T6-G. FIG. 7 is a thermodynamic plot illustrating the ladder fill-up process strategy in its entirety and FIG. 8 is a thermodynamic plot that shows an extrapolation of the first 3 steps of the fill-up process strategy.

Figure 8:
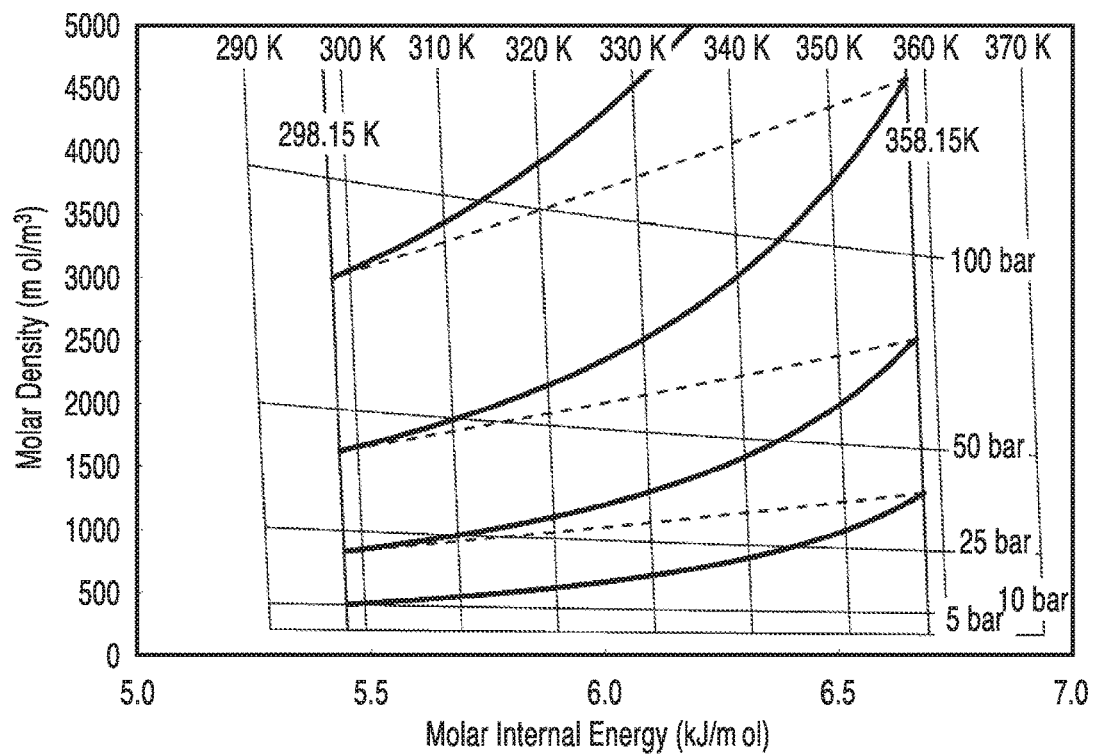
FIG. 8 is a thermodynamic diagram of showing detailed process curves from the diagram of FIG. 7 for clarity.

The process conditions tables and the thermodynamic plots of FIG. 7 and FIG. 8 show that the fill-up process strategy comprises 6 ladder steps (1 step is a filling-up process followed by an emptying process) plus 1 filling-up process for hydrogen inside (T6) to reach 700 bar and 345.37 K. The ladder fill-up process steps do not correspond to the use of a specific fueling station storage tank. The criteria to switch between station storage tanks, even during the same fill-up process, relies on the pressure in the station storage tank always being greater than that in T6 and/or the temperature in the station storage tank always being greater than the chiller output temperature of 273.15 K. This is the reason why station storage tanks that are in communication with vehicle fuel tank T6 may switch.

Example 3

Figure 9:
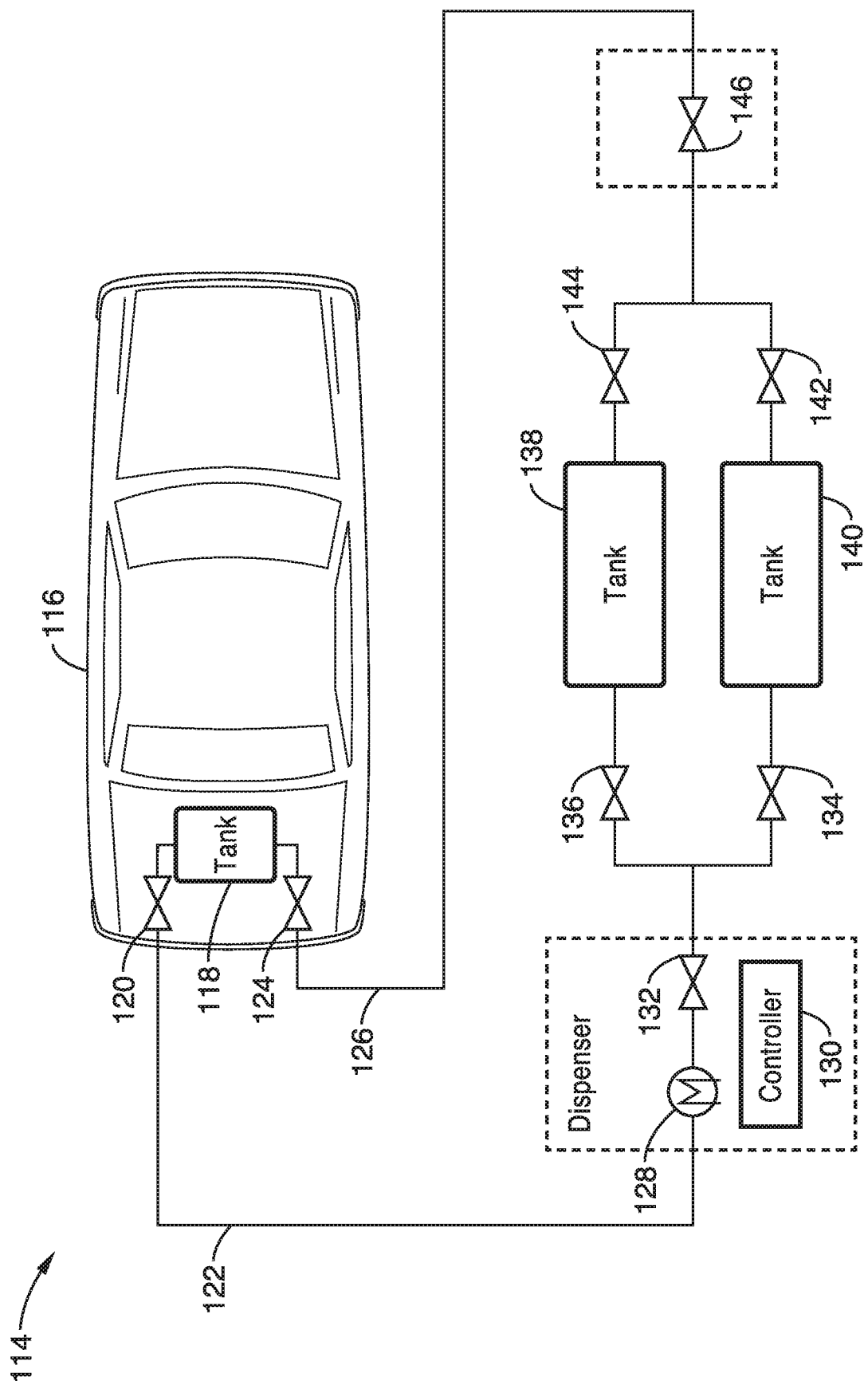
FIG. 9 is a system components diagram of a third embodiment of the technology of a station with fuel storage tank, dump tank, dispenser subsystem, and dumping subsystem.

To further demonstrate the concepts of the system and methods, an alternative embodiment of a filling system with at least two station fuel filling tanks and a dispensing subsystem with a constant temperature feed to the vehicle tank and a dumping subsystem was designed and is illustrated in FIG. 9.

In this embodiment, hydrogen released by the fueling station storage tank is kept at a constant pressure and temperature; then, this hydrogen passes through the isenthalpic valves. However, after the valve, an air cooler is included in the system which either by force (fans) or free (ambient) convection cools down hydrogen's temperature to 298.15 K before it is fed to the vehicle tank. This fill-up is completed by the ladder fill-up process strategy.

Figure 10:
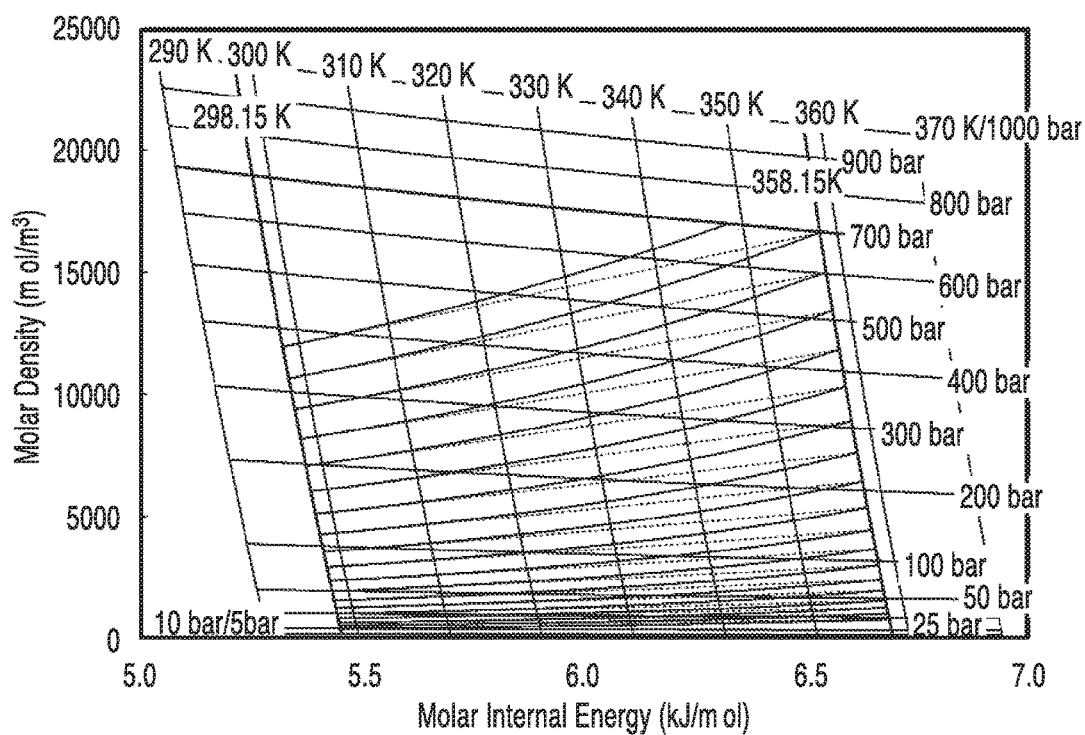
FIG. 10 is thermodynamic diagram of the filling process in the embodiment of the system shown in FIG. 9.
Figure 11:
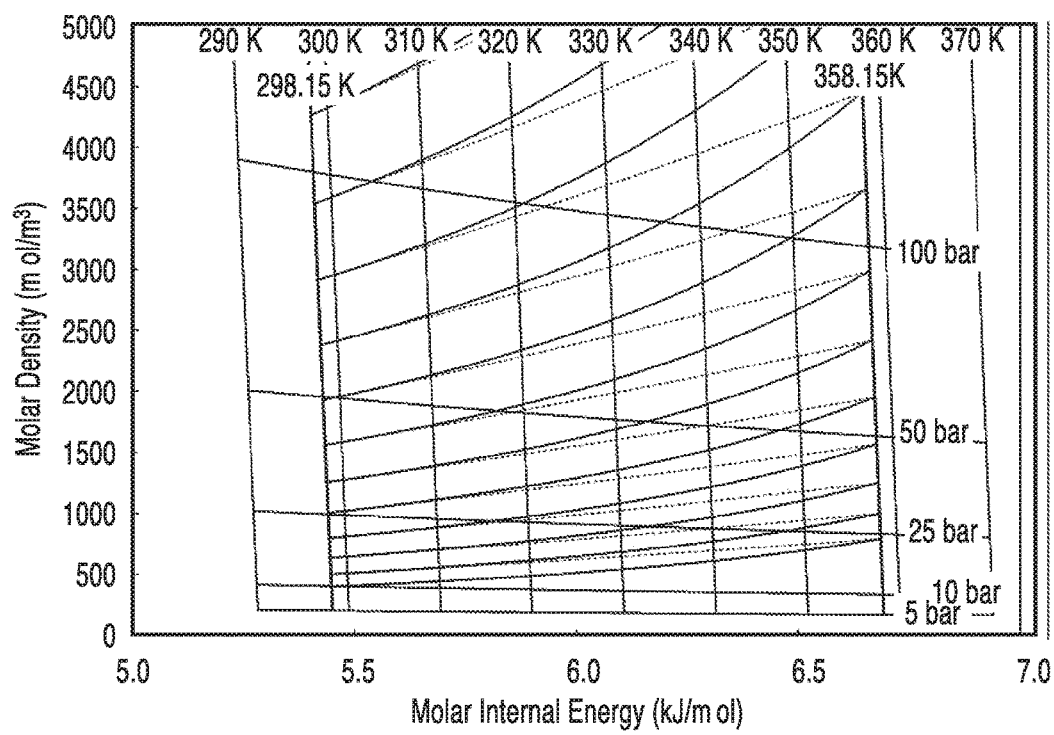
FIG. 11 is a thermodynamic diagram of showing detailed process curves from the diagram of FIG. 10 for clarity.

Two thermodynamic plots are shown in FIG. 10 and FIG. 11 for the fill-up process strategy. FIG. 10 is an overall depiction of the process in a thermodynamic diagram. However, the processes curves at the bottom of the figure are too close to each other making them hard to read. Therefore, the second thermodynamic plot of FIG. 11 with a close-up/zoom of the lower processes curves is provided.

In the system shown schematically in FIG. 9, the vehicle 116 has a fuel storage tank 118 with an intake gate valve 120 (V3-G) that is reversibly connected to a dispenser output line 122. The vehicle fuel tank 118 also has a second gate valve 124 (V4-G) that is reversibly connected to a return or dumping line 126. The dispenser subsystem has an output line 122 ultimately connected to the fuel tank 118 of the vehicle and an input line to receive fuel from the station fuel storage tank (T1) 138 or the second station storage tank (T2) 140 singly or in combination.

The basic components of the dispenser subsystem include an isenthalpic (Joule-Thomson) valve 132, referred as the (V1-JT) valve, a controller 130, and a cooling device 128. The cooling device 128 allows treatment of the J-T valve output of higher temperature hydrogen to lower its temperature before sending it to the vehicle fuel tank 118 through output line 122. The cooling device 128 can lower the temperature to 273.15 K (ice water) or it can be a force or free convection air cooler to lower the temperature to 298.15 K or to an ambient temperature below 298.15 K. The temperature of the hydrogen output by the air cooler 128 is preferably a constant at 298.15 K in this embodiment.

Fuel is provided to the JT valve (V1-JT) 132 of the dispenser subsystem from two station storage tanks and gate valves. One fuel storage tank (T1) 138 has an output gate valve 136 (V1-G) that is connected to an input line to the first JT valve 132. The input line to the dispenser may also be fed from an output gate valve 134 (V2-G) from a second station fuel storage tank (T2)140 that primarily serves as a dump tank.

A tank input valve 144 (V5-G) meters returning fuel to tank 138 from the vehicle fuel tank (T3) 118 through the return line 126 and a second JT valve 146 (V2-JT). A second tank input gate valve 142 (V6-G) meters the returning fuel from the second JT valve 146 to the second fuel storage tank (T2) 140. The return JT valve 146 is positioned before the inlet valves 142, 144 of the two storage tanks 138, 140. The dispenser subsystem controller 130 is operably coupled to all of the valves and sensors of the entire fueling system.

In this illustration, fuel storage tank (T1)138 is assumed to have an infinite volume capacity in order to keep its outlet pressure at approximately (1000 bar) and the temperature at a (298.15 K) constant.

The vehicle tank 118 (T3) has a volume capacity is 0.108 m³ and tank (T2) 140 is assumed to have a volume capacity that is ten times greater than (T3) at a volume of approximately 1.08 m³. Tank (T2) is the tank that receives the hydrogen that is dumped from the vehicle fuel tank (T3). The mass flowrate and total process time are arbitrary. Therefore, the ladder fill-up process can last less than 1-minute by selecting the appropriate mass flowrate.

Referring also to Table 5 that the state of every valve depending on the ladder step of tank filling (in) or emptying (out) and Table 6 that shows the thermodynamic properties inside tanks T1-T3, the filling scheme is shown for this embodiment. The thermodynamic plot of FIG. 10 illustrates the ladder fill-up process strategy in its entirety and FIG. 11 shows an extrapolation of the first 9 steps of the fill-up process strategy.

It can be seen that the process conditions of tables 5 and 6 and the thermodynamic plots of FIG. 10 and FIG. 11 show that the fill-up process strategy comprises 18 ladder steps (1 step is a filling-up process followed by an emptying process) plus 1 filling-up process for hydrogen inside (T3) necessary to reach 700 bar and 348.63 K.

Example 4

The versatility of the elements of the filling system and methods was demonstrated with an alternative embodiment to the station scheme shown in FIG. 9 to demonstrate a constant temperature feed to vehicle with constant vehicle tank filling and emptying.

In this embodiment, hydrogen that is released by the fueling station storage tank is kept at a constant pressure and temperature. Then this hydrogen passes through the isenthalpic valves of the system. However, after the valve, a chiller is included in the system which cools down hydrogen's temperature to 298.15 K before it is fed to the vehicle tank. This fill-up is completed by the ladder fill-up process strategy. However, during the fill-up process the vehicle tank is allowed to empty at a lower mass flowrate than the fill-up. Conversely, during the emptying process the vehicle tank is allowed to fill-up at a lower mass flowrate than the emptying. Therefore, the vehicle tank is open at both ends.

In this illustration, the temperature of the hydrogen output by the chiller 128 is constant at 273.15 K. The hydrogen mass flowrate was 0.317 kg/s. During a typical fill-up process step, the mass flowrate is 90% of 0.317 kg/s while the emptying is approximately 10% of 0.317 kg/s. Conversely, during an emptying process the mass flowrate is 90% of 0.317 kg/s while the fill-up is 10% of 0.317 kg/s. Total time: 37.33 seconds.

Tank 138 (T1) was assumed to have an infinite volume capacity in order to keep its outlet pressure (1000 bar) and the temperature (298.15 K) constant. The volume capacity of tank 118 (T3) is 0.108 m³. The state of tank (T2) was not considered. Valves (V3-G) and (V4-G) restrict the flow of hydrogen depending on the process step.

Table 7 shows the state of the valves during each step and Table 8 shows the thermodynamic properties inside tanks (T1) and (T3). In Table 7 the opening notations of the gate valves and JT valves have on and off conditions. However, Flow restricting valves (VX-R) have two conditions: 90: mass flow is restricted to 90% of feed mass flowrate and 10: mass flow is restricted to 10% of feed mass flowrate.

Figure 12:
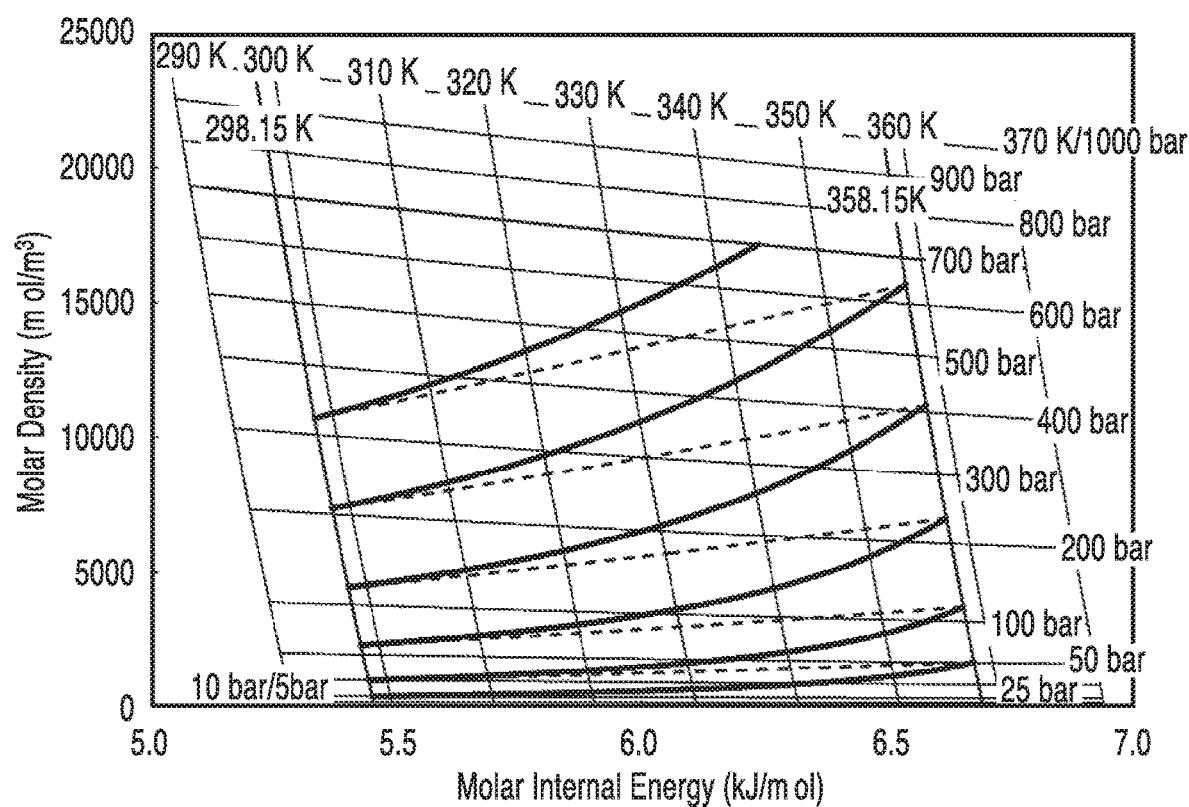
FIG. 12 is thermodynamic diagram of an alternative filling process used in the embodiment of the system shown in FIG. 9.

There is one thermodynamic plot that illustrates the ladder fill-up process strategy in its entirety. The thermodynamic plot of the system is shown in FIG. 12. Only one figure is shown since the processes curves are well spread in the plot, making them easy to read; thus, no second close-up/zoom in figure was added.

The process conditions shown in Table 7 and Table 8 as well as the thermodynamic plot of FIG. 12 show that the fill-up process strategy comprises 5 ladder steps (1 step is a filling-up process followed by an emptying process) plus 1 filling-up process for hydrogen inside (T3) to reach 700 bar and 344.42 K.

Example 5

To further demonstrate the versatility of the elements of the filling system and methods, an alternative embodiment to the station scheme shown in FIG. 9 was provided to demonstrate a system with a constant temperature feed to the vehicle fuel tank with constant vehicle tank filling/emptying while keeping the temperature inside the vehicle tank constant. In this example, hydrogen released by the fueling station storage tank (T1) 138 is kept at a constant pressure and temperature. The hydrogen then passes through the isenthalpic valves. However, after the valve, a chiller is included in the system which cools down the temperature of the hydrogen to 273.15 K before it is fed to the vehicle fuel tank 118.

The fill-up strategy expands on the concept of having both ends of the vehicle tank open, i.e. hydrogen is allowed to be fed into the vehicle tank while the tank itself is allowed to release hydrogen. This embodiment does not follow a ladder fill-up strategy. The fueling station dumping tank properties of hydrogen are not shown.

In this embodiment, the hydrogen fueling station storage tank (T1) 138, the hydrogen fueling station dumping tank (T2) 140, and the vehicle storage tank (T3) 118 are used. The chiller is located after the J-T valve and the temperature of the hydrogen output by the chiller is constant at 273.15 K.

Hydrogen mass flowrate varies as a function of time. Flow restricting valves (VX-R) adjust themselves as a function of time to allow for a varying flowrate. Tank (T1) was assumed to have an infinite volume capacity in order to keep its outlet pressure (1000 bar) and temperature (298.15 K) constant. Tank (T3) volume capacity is 0.108 m³. Tank (T2) volume was not considered. Valves V3 and V4 restrict or allow the flow of hydrogen depending on the process step. Total time was 70 seconds.

The process shown in Table 9 and Table 10 show the valve states and process conditions. The process conditions tables show that the fill-up process strategy consists of one fill-up step that ends when the temperature inside the vehicle tank reaches the temperature limit of 358.15 K. Then, a second step that allows for both filling and emptying of the vehicle tank takes place keeping the temperature inside the vehicle constant at 358.15 K until the temperature in the vehicle fuel tank (T3) reaches 700 bar while the mass flow in and out varies with time.

As previously described, the foregoing embodiments are by way of example and are without limitation, and the invention can be embodied in additional various ways that will become apparent to those skilled in the art without departing from the invention herein. For example, it will be appreciated that there may be a pressure loss in flow of fuel that is emptied into the dumping tank. Accordingly, it may be desirable to include a compressor downstream of the dumping tank to increase the pressure to a desired level before the fuel is recirculated to the vehicle. Alternatively, instead of using a dumping tank, a compressor with or without a smaller "surge" tank could be used to repressurize the fluid exiting the tank being filled, so it can be recycled into the tank being filled. The fluid being recycled could be cooled either before or after its repressurization, and then be mixed with the fluid coming from the station to be fed into the tank being filled. This compressor/surge tank/cooler combination or some of its parts could be located within the dispenser or external to the dispenser.

From the description herein, it will be appreciated that the present invention teaches novel systems and methods for filling the fuel storage tank of a vehicle. The methods of the invention beneficially employ steps of first filling the tank with fuel and then emptying some of the fuel from the tank, and then repeating the process until the tank is filled. Alternatively, the tank is filled at one flow rate and simultaneously emptied at a lower flow rate until the tank is filled. These methods allow for management of the fuel temperature so that the fuel temperature does not exceed a predetermined maximum temperature or fall below a predetermined minimum temperature.

From the description herein, it will be appreciated that that the present disclosure encompasses multiple embodiments which include, but are not limited to, the following:

1. A method of dispensing gaseous fuel to a vehicle, the method comprising: (a) dispensing fuel to a fuel tank in a vehicle at a first flow rate and for a first period of time; (b) removing fuel from the fuel tank at a second flow rate and for a second period of time; and (c) repeating steps (a) and (b) sequentially to maintain fuel temperature within a desired temperature range and until the vehicle fuel tank is filled to a desired level.

2. The method of any preceding embodiment, further comprising stopping the dispensing of fuel to the vehicle fuel tank when a temperature inside the vehicle fuel tank reaches a maximum allowable temperature.

3. The method of any preceding embodiment, further comprising stopping the removal of fuel from the vehicle fuel tank when a temperature inside of the vehicle storage tank reaches a minimum.

4. The method of any preceding embodiment, wherein the first period of time of dispensing of fuel to the vehicle fuel tank is determined by a set high temperature limit of the fuel inside of the vehicle fuel tank; and wherein the second period of time for removing fuel from the vehicle fuel tank is determined by a set low temperature limit of the fuel inside of the vehicle fuel tank.

5. The method of any preceding embodiment, wherein the dispensing of the vehicle fuel tank is stopped when the temperature inside the vehicle storage tank reaches a maximum allowable temperature of about 358.15 K; and wherein the removal of fuel from the vehicle storage tank is stopped when the temperature inside the vehicle storage tank reaches a minimum of about 298.15 K.

6. The method of any preceding embodiment, further comprising: stopping the dispensing of fuel to the vehicle fuel tank when pressure inside the vehicle fuel tank reaches an upper pressure limit and a temperature inside the vehicle fuel tank is below an upper temperature limit.

7. A compressed gas fueling station for a vehicle, the fueling station comprising: (a) at least one fueling station storage tank; (b) a dispenser connected to the fueling station storage tank; (c) wherein the dispenser comprises an dispensing gate valve and a controller; (d) wherein the dispenser is configured for fluidic coupling of the fueling station storage tank to a vehicle storage tank through the dispensing gate valve; and (e) a fueling station dumping tank configured for connection to the vehicle fuel tank through an intake gate valve and connected to the dispenser through an output gate valve; (f) wherein the controller is configured to control operation of the gate valves; and (g) wherein the controller of the dispenser further comprises a processor and programming executable on the processor for controlling the operation of the gate valves.

8. The station of any preceding embodiment, wherein the dispensing gate valve comprises an isenthalpic (Joule-Thomson) valve.

9. The station of any preceding embodiment, the dispenser further comprising: a gas cooler coupled to an output line from the dispensing gate valve; wherein gas from the dispenser is cooled before entering the vehicle fuel tank.

10. The station of any preceding embodiment, wherein the gas cooler is a cooling device selected from the group of devices consisting of a force convection air cooler, a free convection air cooler and a refrigeration cooler.

11. The station of any preceding embodiment, wherein the dumping tank intake valve comprises an isenthalpic (Joule-Thomson) valve.

12. A fueling station for a vehicle, the fueling station comprising: (a) a fueling station storage tank with an input gate valve and an output gate valve; (b) a dispenser comprising an intake line, an output line, a dispenser valve and a controller; (c) wherein the dispenser is connected to the fueling station storage tank by the intake line through the station storage tank output gate valve; (d) wherein the dispenser is configured for fluidic coupling of the fueling station storage tank to a vehicle storage tank through the first valve; (e) a fueling station dumping tank with a dump tank input gate valve and a dump tank output gate valve coupled to the dispenser intake line; and (f) a return line configured for connection to the vehicle storage tank through a fuel tank gate valve, the return line fluidly coupled to the fueling station storage tank through the station storage tank input gate valve and the dumping tank through the dump tank input gate valve; (g) wherein the controller is configured to control operation of the gate valves; and (h) wherein the controller further comprises a processor and programming executable on the processor for performing steps comprising: (i) dispensing fuel to a fuel tank in a vehicle at a first flow rate and for a first period of time; (ii) removing fuel from the storage tank at a second flow rate and for a second period of time; and (iii) repeating steps (i) and (ii) sequentially to maintain fuel temperature within a desired temperature range and until the vehicle fuel tank is filled to a desired level.

13. The station of any preceding embodiment, wherein the dispensing gate valve comprises an isenthalpic (Joule-Thomson) valve.

14. The station of any preceding embodiment, further comprising: an isenthalpic (Joule-Thomson) valve fluidly coupled to the return line between the vehicle storage tank and the station storage tank input gate valve and the dump tank input gate valve.

15. The station of any preceding embodiment, the dispenser further comprising: a gas cooler coupled to an output line from the dispensing gate valve; wherein gas from the dispenser is cooled before entering the vehicle fuel tank.

16. The station of any preceding embodiment, the programming of the controller further comprising: stopping the filling of fuel to the vehicle fuel tank when a temperature inside the vehicle fuel tank reaches a maximum allowable temperature.

17. The station of any preceding embodiment, the programming of the controller further comprising: stopping the removal of fuel from the vehicle fuel tank when a temperature inside of the vehicle storage tank reaches a minimum.

18. The station of any preceding embodiment, the programming of the controller further comprising: determining the first period of time of dispensing of fuel to the vehicle fuel tank by a set high temperature limit of the fuel inside of the vehicle fuel tank; and determining the second period of time for removing fuel from the vehicle fuel tank by a set low temperature limit of the fuel inside of the vehicle fuel tank.

19. The station of any preceding embodiment, the programming of the controller further comprising: stopping the dispensing of the vehicle fuel tank when the temperature inside the vehicle storage tank reaches a maximum allowable temperature of about 358.15 K; and stopping the removal of fuel from the vehicle storage tank is stopped when the temperature inside the vehicle storage tank reaches a minimum of about 298.15 K.

20. The station of any preceding embodiment, the programming of the controller further comprising: stopping the dispensing of fuel to the vehicle fuel tank when pressure inside the vehicle fuel tank reaches an upper pressure limit; and when a temperature inside the vehicle fuel tank is below an upper temperature limit.

21. A pressurized gas fueling station for a vehicle, the fueling station comprising: (a) a fueling station storage tank; (b) a dispenser connected to the fueling station storage tank; (c) wherein the dispenser comprises a first valve and a controller; (d) wherein the dispenser is configured for fluidic coupling of the fueling station storage tank to a vehicle storage tank through the first valve; (e) a fueling station dumping tank connected to the fueling station storage tank through a second valve and configured for connection to the vehicle storage tank through a third valve; and (f) a compressor positioned downstream of the dumping tank for increasing pressure of fuel from the dumping tank; (g) wherein the controller further comprises a processor and programming executable on the processor for performing steps comprising: (i) filling the vehicle storage tank with fuel until temperature of the fuel inside the vehicle storage tank reaches a high temperature limit, (ii) emptying the vehicle storage tank into the fueling station dumping tank until the temperature of the fuel inside the vehicle storage tank reaches a low temperature limit, and (iii) repeating steps (i) and (ii) until the vehicle storage tank is filled to a desired level.

22. A fueling station for a vehicle, the fueling station comprising: (a) a fueling station storage tank; (b) a dispenser connected to the fueling station storage tank; (c) wherein the dispenser comprises a first valve and a controller; (d) wherein the dispenser is configured for fluidic coupling of the fueling station storage tank to a vehicle storage tank through the first valve; (e) a compressor and a surge tank configured for connection to the vehicle storage tank and positioned downstream of the fueling station storage tank; (f) wherein the controller further comprises a processor and programming executable on the processor for performing steps comprising: (i) filling the vehicle storage tank with fuel until temperature of the fuel inside the vehicle storage tank reaches a high temperature limit, (ii) emptying the vehicle storage tank into the fueling station dumping tank until the temperature of the fuel inside the vehicle storage tank reaches a low temperature limit, and (iii) repeating steps (i) and (ii) until the vehicle storage tank is filled to a desired level.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Example 1 System Valve States

| Process Step | V1-G | V2-G | V3-G | V4-G | V5-G | V6-G | V1-JT | V2-JT |
|---|---|---|---|---|---|---|---|---|
| Step 1 (F) | On | Off | On | Off | Off | Off | On | Off |
| Step 1 (E) | Off | Off | Off | On | Off | On | Off | On |
| Step 2 (F) | On | Off | On | Off | Off | Off | On | Off |
| Step 2 (E) | Off | Off | Off | On | Off | On | Off | On |
| Step 3 (F) | On | Off | On | Off | Off | Off | On | Off |
| Step 3 (E) | Off | Off | Off | On | Off | On | Off | On |
| Step 4 (F) | On | Off | On | Off | Off | Off | On | Off |
| Step 4 (E) | Off | Off | Off | On | Off | On | Off | On |
| Step 5 (F) | On | Off | On | Off | Off | Off | On | Off |
| Step 5 (E) | Off | Off | Off | On | Off | On | Off | On |
| Step 6 (F) | On | Off | On | Off | Off | Off | On | Off |
| Step 6 (E) | Off | Off | Off | On | Off | On | Off | On |
| Step 7 (F) | On | Off | On | Off | Off | Off | On | Off |
| Step 7 (E) | Off | Off | Off | On | Off | On | Off | On |
| Step 8 (F) | On | Off | On | Off | Off | Off | On | Off |

TABLE 2

| Example 1 Process Conditions | | | |
|---|---|---|---|
| Process Step | T1 | T2 | T3 |
| Step 1 (F) | OUT | | IN |
| $P_{initial}$ (bar) | 1000 | 10 | 10 |
| $P_{final}$ (bar) | 1000 | 10 | 30.04 |
| $T_{initial}$ (K) | 233.15 | 298.15 | 298.15 |
| $T_{final}$ (K) | 233.15 | 298.15 | 358.15 |
| $m_{initial}$ (kg) | N/A | 0.873 | 0.087 |
| $m_{final}$ (kg) | N/A | 0.873 | 0.216 |
| Step 1 (E) | | IN | OUT |
| $P_{initial}$ (bar) | 1000 | 10 | 30.04 |
| $P_{final}$ (bar) | 1000 | 11.40 | 15.86 |
| $T_{initial}$ (K) | 233.15 | 298.15 | 358.15 |
| $T_{final}$ (K) | 233.15 | 311.74 | 298.16 |
| $m_{initial}$ (kg) | N/A | 0.873 | 0.216 |
| $m_{final}$ (kg) | N/A | 0.951 | 0.138 |
| Step 2 (F) | OUT | | IN |
| $P_{initial}$ (bar) | 1000 | 11.40 | 15.86 |
| $P_{final}$ (bar) | 1000 | 11.40 | 47.62 |
| $T_{initial}$ (K) | 233.15 | 311.74 | 298.16 |
| $T_{final}$ (K) | 233.15 | 311.74 | 358.14 |
| $m_{initial}$ (kg) | N/A | 0.951 | 0.138 |
| $m_{final}$ (kg) | N/A | 0.951 | 0.339 |
| Step 2 (E) | | IN | OUT |
| $P_{initial}$ (bar) | 1000 | 11.40 | 47.62 |
| $P_{final}$ (bar) | 1000 | 13.59 | 25.16 |
| $T_{initial}$ (K) | 233.15 | 311.74 | 358.14 |
| $T_{final}$ (K) | 233.15 | 329.10 | 298.14 |
| $m_{initial}$ (kg) | N/A | 0.951 | 0.339 |
| $m_{final}$ (kg) | N/A | 1.073 | 0.218 |
| Step 3 (F) | OUT | | IN |
| $P_{initial}$ (bar) | 1000 | 13.59 | 25.16 |
| $P_{final}$ (bar) | 1000 | 13.59 | 75.56 |
| $T_{initial}$ (K) | 233.15 | 329.10 | 298.14 |
| $T_{final}$ (K) | 233.15 | 329.10 | 358.15 |
| $m_{initial}$ (kg) | N/A | 1.073 | 0.218 |
| $m_{final}$ (kg) | N/A | 1.073 | 0.531 |
| Step 3 (E) | | IN | OUT |
| $P_{initial}$ (bar) | 1000 | 13.59 | 75.56 |
| $P_{final}$ (bar) | 1000 | 16.99 | 39.93 |
| $T_{initial}$ (K) | 233.15 | 329.10 | 358.15 |
| $T_{final}$ (K) | 233.15 | 349.45 | 298.14 |
| $m_{initial}$ (kg) | N/A | 1.073 | 0.531 |
| $m_{final}$ (kg) | N/A | 1.262 | 0.342 |
| Step 4 (F) | OUT | | IN |
| $P_{initial}$ (bar) | 1000 | 16.99 | 39.93 |
| $P_{final}$ (bar) | 1000 | 16.99 | 120.03 |
| $T_{initial}$ (K) | 233.15 | 349.45 | 298.14 |
| $T_{final}$ (K) | 233.15 | 349.45 | 358.14 |
| $m_{initial}$ (kg) | N/A | 1.262 | 0.342 |
| $m_{final}$ (kg) | N/A | 1.262 | 0.823 |
| Step 4 (E) | | IN | OUT |
| $P_{initial}$ (bar) | 1000 | 16.99 | 120.03 |
| $P_{final}$ (bar) | 1000 | 22.21 | 63.49 |
| $T_{initial}$ (K) | 233.15 | 349.45 | 358.14 |
| $T_{final}$ (K) | 233.15 | 371.27 | 298.14 |
| $m_{initial}$ (kg) | N/A | 1.262 | 0.823 |
| $m_{final}$ (kg) | N/A | 1.549 | 0.536 |
| Step 5 (F) | OUT | | IN |
| $P_{initial}$ (bar) | 1000 | 22.21 | 63.49 |
| $P_{final}$ (bar) | 1000 | 22.21 | 191.60 |
| $T_{initial}$ (K) | 233.15 | 371.27 | 298.14 |
| $T_{final}$ (K) | 233.15 | 371.27 | 358.15 |
| $m_{initial}$ (kg) | N/A | 1.549 | 0.536 |
| $m_{final}$ (kg) | N/A | 1.549 | 1.266 |
| Step 5 (E) | | IN | OUT |
| $P_{initial}$ (bar) | 1000 | 22.21 | 191.60 |
| $P_{final}$ (bar) | 1000 | 30.11 | 101.43 |
| $T_{initial}$ (K) | 233.15 | 371.27 | 358.15 |
| $T_{final}$ (K) | 233.15 | 392.79 | 298.15 |
| $m_{initial}$ (kg) | N/A | 1.549 | 1.266 |
| $m_{final}$ (kg) | N/A | 1.977 | 0.837 |
| Step 6 (F) | OUT | | IN |
| $P_{initial}$ (bar) | 1000 | 30.11 | 101.43 |
| $P_{final}$ (bar) | 1000 | 30.11 | 309.39 |
| $T_{initial}$ (K) | 233.15 | 392.79 | 298.15 |
| $T_{final}$ (K) | 233.15 | 392.79 | 358.15 |
| $m_{initial}$ (kg) | N/A | 1.977 | 0.837 |
| $m_{final}$ (kg) | N/A | 1.977 | 1.925 |
| Step 6 (E) | | IN | OUT |
| $P_{initial}$ (bar) | 1000 | 30.11 | 309.39 |
| $P_{final}$ (bar) | 1000 | 41.83 | 163.83 |
| $T_{initial}$ (K) | 233.15 | 392.79 | 358.15 |
| $T_{final}$ (K) | 233.15 | 412.87 | 298.14 |
| $m_{initial}$ (kg) | N/A | 1.977 | 1.925 |
| $m_{final}$ (kg) | N/A | 2.601 | 1.302 |
| Step 7 (F) | OUT | | IN |
| $P_{initial}$ (bar) | 1000 | 41.83 | 163.83 |
| $P_{final}$ (bar) | 1000 | 41.83 | 513.47 |
| $T_{initial}$ (K) | 233.15 | 412.87 | 298.14 |
| $T_{final}$ (K) | 233.15 | 412.87 | 358.15 |
| $m_{initial}$ (kg) | N/A | 2.601 | 1.302 |
| $m_{final}$ (kg) | N/A | 2.601 | 2.895 |
| Step 7 (E) | | IN | OUT |
| $P_{initial}$ (bar) | 1000 | 41.83 | 513.47 |
| $P_{final}$ (bar) | 1000 | 58.80 | 271.78 |
| $T_{initial}$ (K) | 233.15 | 412.87 | 358.15 |
| $T_{final}$ (K) | 233.15 | 431.66 | 298.15 |
| $m_{initial}$ (kg) | N/A | 2.601 | 2.895 |
| $m_{final}$ (kg) | N/A | 3.472 | 2.023 |
| Step 8 (F) | OUT | | IN |
| $P_{initial}$ (bar) | 1000 | 58.80 | 271.78 |
| $P_{final}$ (bar) | 1000 | 58.80 | 700.00 |
| $T_{initial}$ (K) | 233.15 | 431.66 | 298.15 |
| $T_{final}$ (K) | 233.15 | 431.66 | 348.86 |
| $m_{initial}$ (kg) | N/A | 3.472 | 2.023 |
| $m_{final}$ (kg) | N/A | 3.472 | 3.698 |

TABLE 3

Example 2 System Valve States

| Process Step | V1-G | V2-G | V3-G | V4-G | V5-G | V6-G | V7-G | V8-G up-right | V8-G down-right | V9-G up-left | V9-G down-left | V10-G | V11-G | V1-JT |
|---|---|---|---|---|---|---|---|---|---|---|---|---|---|---|
| Step 1 (F) | On | Off | Off | Off | Off | On | Off | On | Off | On | Off | On | Off | On |
| Step 1 (E) | Off | Off | Off | Off | On | Off | On | Off | On | Off | On | Off | On | On |
| Step 2a (F) | On | Off | Off | Off | Off | On | Off | On | Off | On | Off | On | Off | On |
| Step 2b (F) | Off | On | Off | Off | Off | On | Off | On | Off | On | Off | On | Off | On |
| Step 2 (E) | Off | Off | Off | Off | On | Off | On | Off | On | Off | On | Off | On | On |
| Step 3 (F) | Off | On | Off | Off | Off | On | Off | On | Off | On | Off | On | Off | On |
| Step 3 (E) | Off | Off | Off | Off | On | Off | On | Off | On | Off | On | Off | On | On |
| Step 4 (F) | Off | On | Off | Off | Off | On | Off | On | Off | On | Off | On | Off | On |
| Step 4 (E) | Off | Off | Off | Off | On | Off | On | Off | On | Off | On | Off | On | On |
| Step 5 (F) | Off | Off | On | Off | Off | On | Off | On | Off | On | Off | On | Off | On |
| Step 5 (E) | Off | Off | Off | Off | On | Off | On | Off | On | Off | On | Off | on | On |
| Step 6a (F) | Off | Off | On | Off | Off | On | Off | On | Off | On | Off | On | Off | On |
| Step 6b (F) | Off | Off | Off | On | Off | On | Off | On | Off | On | Off | On | Off | On |
| Step 6 (E) | Off | Off | Off | Off | On | Off | On | Off | On | Off | On | Off | On | On |
| Step 7 (F) | Off | Off | Off | On | Off | On | Off | On | Off | On | Off | On | Off | On |

TABLE 4

Example 2 Process Conditions

| Process Step | T1 | T2 | T3 |
|---|---|---|---|
| Step 1 (F) | OUT | | IN |
| $P_{initial}$ (bar) | 1000 | 10 | 10 |
| $P_{final}$ (bar) | 1000 | 10 | 30.04 |
| $T_{initial}$ (K) | 233.15 | 298.15 | 298.15 |
| $T_{final}$ (K) | 233.15 | 298.15 | 358.15 |
| $m_{initial}$ (kg) | N/A | 0.873 | 0.087 |
| $m_{final}$ (kg) | N/A | 0.873 | 0.216 |
| Step 1 (E) | | IN | OUT |
| $P_{initial}$ (bar) | 1000 | 10 | 30.04 |
| $P_{final}$ (bar) | 1000 | 11.40 | 15.86 |
| $T_{initial}$ (K) | 233.15 | 298.15 | 358.15 |
| $T_{final}$ (K) | 233.15 | 311.74 | 298.16 |
| $m_{initial}$ (kg) | N/A | 0.873 | 0.216 |
| $m_{final}$ (kg) | N/A | 0.951 | 0.138 |
| Step 2 (F) | OUT | | IN |
| $P_{initial}$ (bar) | 1000 | 11.40 | 15.86 |
| $P_{final}$ (bar) | 1000 | 11.40 | 47.62 |
| $T_{initial}$ (K) | 233.15 | 311.74 | 298.16 |
| $T_{final}$ (K) | 233.15 | 311.74 | 358.14 |
| $m_{initial}$ (kg) | N/A | 0.951 | 0.138 |
| $m_{final}$ (kg) | N/A | 0.951 | 0.339 |
| Step 2 (E) | | IN | OUT |
| $P_{initial}$ (bar) | 1000 | 11.40 | 47.62 |
| $P_{final}$ (bar) | 1000 | 13.59 | 25.16 |
| $T_{initial}$ (K) | 233.15 | 311.74 | 358.14 |
| $T_{final}$ (K) | 233.15 | 329.10 | 298.14 |
| $m_{initial}$ (kg) | N/A | 0.951 | 0.339 |
| $m_{final}$ (kg) | N/A | 1.073 | 0.218 |
| Step 3 (F) | OUT | | IN |
| $P_{initial}$ (bar) | 1000 | 13.59 | 25.16 |
| $P_{final}$ (bar) | 1000 | 13.59 | 75.56 |
| $T_{initial}$ (K) | 233.15 | 329.10 | 298.14 |
| $T_{final}$ (K) | 233.15 | 329.10 | 358.15 |
| $m_{initial}$ (kg) | N/A | 1.073 | 0.218 |
| $m_{final}$ (kg) | N/A | 1.073 | 0.531 |
| Step 3 (E) | | IN | OUT |
| $P_{initial}$ (bar) | 1000 | 13.59 | 75.56 |
| $P_{final}$ (bar) | 1000 | 16.99 | 39.93 |
| $T_{initial}$ (K) | 233.15 | 329.10 | 358.15 |
| $T_{final}$ (K) | 233.15 | 349.45 | 298.14 |
| $m_{initial}$ (kg) | N/A | 1.073 | 0.531 |
| $m_{final}$ (kg) | N/A | 1.262 | 0.342 |
| Step 4 (F) | OUT | | IN |
| $P_{initial}$ (bar) | 1000 | 16.99 | 39.93 |
| $P_{final}$ (bar) | 1000 | 16.99 | 120.03 |
| $T_{initial}$ (K) | 233.15 | 349.45 | 298.14 |
| $T_{final}$ (K) | 233.15 | 349.45 | 358.14 |
| $m_{initial}$ (kg) | N/A | 1.262 | 0.342 |
| $m_{final}$ (kg) | N/A | 1.262 | 0.823 |
| Step 4 (E) | | IN | OUT |
| $P_{initial}$ (bar) | 1000 | 16.99 | 120.03 |
| $P_{final}$ (bar) | 1000 | 22.21 | 63.49 |
| $T_{initial}$ (K) | 233.15 | 349.45 | 358.14 |
| $T_{final}$ (K) | 233.15 | 371.27 | 298.14 |
| $m_{initial}$ (kg) | N/A | 1.262 | 0.823 |
| $m_{final}$ (kg) | N/A | 1.549 | 0.536 |
| Step 5 (F) | OUT | | IN |
| $P_{initial}$ (bar) | 1000 | 22.21 | 63.49 |
| $P_{final}$ (bar) | 1000 | 22.21 | 191.60 |
| $T_{initial}$ (K) | 233.15 | 371.27 | 298.14 |
| $T_{final}$ (K) | 233.15 | 371.27 | 358.15 |
| $m_{initial}$ (kg) | N/A | 1.549 | 0.536 |
| $m_{final}$ (kg) | N/A | 1.549 | 1.266 |
| Step 5 (E) | | IN | OUT |
| $P_{initial}$ (bar) | 1000 | 22.21 | 191.60 |
| $P_{final}$ (bar) | 1000 | 30.11 | 101.43 |
| $T_{initial}$ (K) | 233.15 | 371.27 | 358.15 |
| $T_{final}$ (K) | 233.15 | 392.79 | 298.15 |
| $m_{initial}$ (kg) | N/A | 1.549 | 1.266 |
| $m_{final}$ (kg) | N/A | 1.977 | 0.837 |
| Step 6 (F) | OUT | | IN |
| $P_{initial}$ (bar) | 1000 | 30.11 | 101.43 |
| $P_{final}$ (bar) | 1000 | 30.11 | 309.39 |
| $T_{initial}$ (K) | 233.15 | 392.79 | 298.15 |
| $T_{final}$ (K) | 233.15 | 392.79 | 358.15 |

TABLE 4-continued

Example 2 Process Conditions

| Process Step | T1 | T2 | T3 |
|---|---|---|---|
| $m_{initial}$ (kg) | N/A | 1.977 | 0.837 |
| $m_{final}$ (kg) | N/A | 1.977 | 1.925 |
| Step 6 (E) | | IN | OUT |
| $P_{initial}$ (bar) | 1000 | 30.11 | 309.39 |
| $P_{final}$ (bar) | 1000 | 41.83 | 163.83 |
| $T_{initial}$ (K) | 233.15 | 392.79 | 358.15 |
| $T_{final}$ (K) | 233.15 | 412.87 | 298.14 |
| $m_{initial}$ (kg) | N/A | 1.977 | 1.925 |
| $m_{final}$ (kg) | N/A | 2.601 | 1.302 |
| Step 7 (F) | | OUT | IN |
| $P_{initial}$ (bar) | 1000 | 41.83 | 163.83 |
| $P_{final}$ (bar) | 1000 | 41.83 | 513.47 |
| $T_{initial}$ (K) | 233.15 | 412.87 | 298.14 |
| $T_{final}$ (K) | 233.15 | 412.87 | 358.15 |
| $m_{initial}$ (kg) | N/A | 2.601 | 1.302 |
| $m_{final}$ (kg) | N/A | 2.601 | 2.895 |
| Step 7 (E) | | IN | OUT |
| $P_{initial}$ (bar) | 1000 | 41.83 | 513.47 |
| $P_{final}$ (bar) | 1000 | 58.80 | 271.78 |
| $T_{initial}$ (K) | 233.15 | 412.87 | 358.15 |
| $T_{final}$ (K) | 233.15 | 431.66 | 298.15 |
| $m_{initial}$ (kg) | N/A | 2.601 | 2.895 |
| $m_{final}$ (kg) | N/A | 3.472 | 2.023 |
| Step 8 (F) | | OUT | IN |
| $P_{initial}$ (bar) | 1000 | 58.80 | 271.78 |
| $P_{final}$ (bar) | 1000 | 58.80 | 700.00 |
| $T_{initial}$ (K) | 233.15 | 431.66 | 298.15 |
| $T_{final}$ (K) | 233.15 | 431.66 | 348.86 |
| $m_{initial}$ (kg) | N/A | 3.472 | 2.023 |
| $m_{final}$ (kg) | N/A | 3.472 | 3.698 |

TABLE 5

Example 3 System Valve States

| Process Step | V1-G | V2-G | V3-G | V4-G | V5-G | V6-G | V1-JT | V2-JT |
|---|---|---|---|---|---|---|---|---|
| Step 1 (F) | On | Off | On | Off | Off | Off | On | Off |
| Step 1 (E) | Off | Off | Off | On | Off | On | Off | On |
| Step 2 (F) | On | Off | On | Off | Off | Off | On | Off |
| Step 2 (E) | Off | Off | Off | On | Off | On | Off | On |
| Step 3 (F) | On | Off | On | Off | Off | Off | On | Off |
| Step 3 (E) | Off | Off | Off | On | Off | On | Off | On |
| Step 4 (F) | On | Off | On | Off | Off | Off | On | Off |
| Step 4 (E) | Off | Off | Off | On | Off | On | Off | On |
| Step 5 (F) | On | Off | On | Off | Off | Off | On | Off |
| Step 5 (E) | Off | Off | Off | On | Off | On | Off | On |
| Step 6 (F) | On | Off | On | Off | Off | Off | On | Off |
| Step 6 (E) | Off | Off | Off | On | Off | On | Off | On |
| Step 7 (F) | On | Off | On | Off | Off | Off | On | Off |
| Step 7 (E) | Off | Off | Off | On | Off | On | Off | On |
| Step 8 (F) | On | Off | On | Off | Off | Off | On | Off |
| Step 8 (E) | Off | Off | Off | On | Off | On | Off | On |
| Step 9 (F) | On | Off | On | Off | Off | Off | On | Off |
| Step 9 (E) | Off | Off | Off | On | Off | On | Off | On |
| Step 10 (F) | On | Off | On | Off | Off | Off | On | Off |
| Step 10 (E) | Off | Off | Off | On | Off | On | Off | On |
| Step 11 (F) | On | Off | On | Off | Off | Off | On | Off |
| Step 11 (E) | Off | Off | Off | On | Off | On | Off | On |
| Step 12 (F) | On | Off | On | Off | Off | Off | On | Off |
| Step 12 (E) | Off | Off | Off | On | Off | On | Off | On |
| Step 13 (F) | On | Off | On | Off | Off | Off | On | Off |
| Step 13 (E) | Off | Off | Off | On | Off | On | Off | On |
| Step 14 (F) | On | Off | On | Off | Off | Off | On | Off |
| Step 14 (E) | Off | Off | Off | On | Off | On | Off | On |
| Step 15 (F) | On | Off | On | Off | Off | Off | On | Off |
| Step 15 (E) | Off | Off | Off | On | Off | On | Off | On |
| Step 16 (F) | On | Off | On | Off | Off | Off | On | Off |
| Step 16 (E) | Off | Off | Off | On | Off | On | Off | On |
| Step 17 (F) | On | Off | On | Off | Off | Off | On | Off |
| Step 17 (E) | Off | Off | Off | On | Off | On | Off | On |
| Step 18 (F) | On | Off | On | Off | Off | Off | On | Off |
| Step 18 (E) | Off | Off | Off | On | Off | On | Off | On |
| Step 19 (F) | On | Off | On | Off | Off | Off | On | Off |

TABLE 6

Example 3 Process Conditions

| Process Step | T1 | T2 | T3 |
|---|---|---|---|
| Step 1 (F) | | OUT | IN |
| $P_{initial}$ (bar) | 1000 | 10 | 10 |
| $P_{final}$ (bar) | 1000 | 10 | 23.94 |
| $T_{initial}$ (K) | 298.15 | 298.15 | 298.15 |
| $T_{final}$ (K) | 298.15 | 298.15 | 358.14 |
| $m_{initial}$ (kg) | N/A | 0.873 | 0.087 |
| $m_{final}$ (kg) | N/A | 0.873 | 0.173 |
| Step 1 (E) | | IN | OUT |
| $P_{initial}$ (bar) | 1000 | 10 | 23.94 |
| $P_{final}$ (bar) | 1000 | 11.12 | 12.64 |
| $T_{initial}$ (K) | 298.15 | 298.15 | 358.14 |
| $T_{final}$ (K) | 298.15 | 309.18 | 298.15 |
| $m_{initial}$ (kg) | N/A | 0.873 | 0.173 |
| $m_{final}$ (kg) | N/A | 0.936 | 0.110 |
| Step 2 (F) | | OUT | IN |
| $P_{initial}$ (bar) | 1000 | 11.12 | 12.64 |
| $P_{final}$ (bar) | 1000 | 11.12 | 30.20 |
| $T_{initial}$ (K) | 298.15 | 309.18 | 298.15 |
| $T_{final}$ (K) | 298.15 | 309.18 | 358.15 |
| $m_{initial}$ (kg) | N/A | 0.936 | 0.110 |
| $m_{final}$ (kg) | N/A | 0.936 | 0.217 |
| Step 2 (E) | | IN | OUT |
| $P_{initial}$ (bar) | 1000 | 11.12 | 30.20 |
| $P_{final}$ (bar) | 1000 | 12.53 | 15.95 |
| $T_{initial}$ (K) | 298.15 | 309.18 | 358.15 |
| $T_{final}$ (K) | 298.15 | 321.18 | 298.15 |
| $m_{initial}$ (kg) | N/A | 0.936 | 0.217 |
| $m_{final}$ (kg) | N/A | 1.014 | 0.139 |
| Step 3 (F) | | OUT | IN |
| $P_{initial}$ (bar) | 1000 | 12.53 | 15.95 |
| $P_{final}$ (bar) | 1000 | 12.53 | 38.03 |
| $T_{initial}$ (K) | 298.15 | 321.18 | 298.15 |
| $T_{final}$ (K) | 298.15 | 321.18 | 358.15 |
| $m_{initial}$ (kg) | N/A | 1.014 | 0.139 |
| $m_{final}$ (kg) | N/A | 1.014 | 0.273 |
| Step 3 (E) | | IN | OUT |
| $P_{initial}$ (bar) | 1000 | 12.53 | 38.03 |
| $P_{final}$ (bar) | 1000 | 14.29 | 20.09 |
| $T_{initial}$ (K) | 298.15 | 321.18 | 358.15 |
| $T_{final}$ (K) | 298.15 | 33.79 | 298.15 |
| $m_{initial}$ (kg) | N/A | 1.014 | 0.273 |
| $m_{final}$ (kg) | N/A | 1.113 | 0.174 |

TABLE 6-continued

Example 3 Process Conditions

| | | | |
|---|---|---|---|
| Step 4 (F) | | OUT | IN |
| $P_{initial}$ (bar) | 1000 | 14.29 | 20.09 |
| $P_{final}$ (bar) | 1000 | 14.29 | 47.80 |
| $T_{initial}$ (K) | 298.15 | 333.79 | 298.15 |
| $T_{final}$ (K) | 298.15 | 333.79 | 358.15 |
| $m_{initial}$ (kg) | N/A | 1.112 | 0.174 |
| $m_{final}$ (kg) | N/A | 1.112 | 0.341 |
| Step 4 (E) | | IN | OUT |
| $P_{initial}$ (bar) | 1000 | 14.29 | 47.80 |
| $P_{final}$ (bar) | 1000 | 16.50 | 25.26 |
| $T_{initial}$ (K) | 298.15 | 333.79 | 358.15 |
| $T_{final}$ (K) | 298.15 | 346.70 | 298.15 |
| $m_{initial}$ (kg) | N/A | 1.112 | 0.341 |
| $m_{final}$ (kg) | N/A | 1.235 | 0.218 |
| Step 5 (F) | | OUT | IN |
| $P_{initial}$ (bar) | 1000 | 16.50 | 25.26 |
| $P_{final}$ (bar) | 1000 | 16.50 | 59.94 |
| $T_{initial}$ (K) | 298.15 | 346.70 | 298.15 |
| $T_{final}$ (K) | 298.15 | 346.70 | 358.15 |
| $m_{initial}$ (kg) | N/A | 1.235 | 0.218 |
| $m_{final}$ (kg) | N/A | 1.235 | 0.425 |
| Step 5 (E) | | IN | OUT |
| $P_{initial}$ (bar) | 1000 | 16.50 | 59.94 |
| $P_{final}$ (bar) | 1000 | 19.23 | 31.67 |
| $T_{initial}$ (K) | 298.15 | 346.70 | 358.15 |
| $T_{final}$ (K) | 298.15 | 359.59 | 298.15 |
| $m_{initial}$ (kg) | N/A | 1.235 | 0.425 |
| $m_{final}$ (kg) | N/A | 1.386 | 0.273 |
| Step 6 (F) | | OUT | IN |
| $P_{initial}$ (bar) | 1000 | 19.23 | 31.67 |
| $P_{final}$ (bar) | 1000 | 19.23 | 74.91 |
| $T_{initial}$ (K) | 298.15 | 359.59 | 298.15 |
| $T_{final}$ (K) | 298.15 | 359.59 | 358.15 |
| $m_{initial}$ (kg) | N/A | 1.386 | 0.273 |
| $m_{final}$ (kg) | N/A | 1.386 | 0.526 |
| Step 6 (E) | | IN | OUT |
| $P_{initial}$ (bar) | 1000 | 19.23 | 74.91 |
| $P_{final}$ (bar) | 1000 | 22.62 | 39.60 |
| $T_{initial}$ (K) | 298.15 | 359.59 | 358.15 |
| $T_{final}$ (K) | 298.15 | 372.12 | 298.15 |
| $m_{initial}$ (kg) | N/A | 1.386 | 0.526 |
| $m_{final}$ (kg) | N/A | 1.573 | 0.340 |
| Step 7 (F) | | OUT | IN |
| $P_{initial}$ (bar) | 1000 | 22.62 | 39.60 |
| $P_{final}$ (bar) | 1000 | 22.62 | 93.31 |
| $T_{initial}$ (K) | 298.15 | 372.12 | 298.15 |
| $T_{final}$ (K) | 298.15 | 372.12 | 358.15 |
| $m_{initial}$ (kg) | N/A | 1.573 | 0.340 |
| $m_{final}$ (kg) | N/A | 1.573 | 0.649 |
| Step 7 (E) | | IN | OUT |
| $P_{initial}$ (bar) | 1000 | 22.62 | 93.31 |
| $P_{final}$ (bar) | 1000 | 26.78 | 49.34 |
| $T_{initial}$ (K) | 298.15 | 372.12 | 358.15 |
| $T_{final}$ (K) | 298.15 | 384.03 | 298.15 |
| $m_{initial}$ (kg) | N/A | 1.573 | 0.649 |
| $m_{final}$ (kg) | N/A | 1.802 | 0.421 |
| Step 8 (F) | | OUT | IN |
| $P_{initial}$ (bar) | 1000 | 26.78 | 49.34 |
| $P_{final}$ (bar) | 1000 | 26.78 | 115.74 |
| $T_{initial}$ (K) | 298.15 | 384.03 | 298.15 |
| $T_{final}$ (K) | 298.15 | 384.03 | 358.15 |
| $m_{initial}$ (kg) | N/A | 1.802 | 0.421 |
| $m_{final}$ (kg) | N/A | 1.802 | 0.796 |
| Step 8 (E) | | IN | OUT |
| $P_{initial}$ (bar) | 1000 | 26.78 | 115.74 |
| $P_{final}$ (bar) | 1000 | 31.88 | 61.22 |
| $T_{initial}$ (K) | 298.15 | 384.03 | 358.15 |
| $T_{final}$ (K) | 298.15 | 395.10 | 298.15 |
| $m_{initial}$ (kg) | N/A | 1.802 | 0.796 |
| $m_{final}$ (kg) | N/A | 2.080 | 0.518 |
| Step 9 (F) | | OUT | IN |
| $P_{initial}$ (bar) | 1000 | 31.88 | 61.22 |
| $P_{final}$ (bar) | 1000 | 31.88 | 142.86 |
| $T_{initial}$ (K) | 298.15 | 395.10 | 298.15 |
| $T_{final}$ (K) | 298.15 | 395.10 | 358.15 |
| $m_{initial}$ (kg) | N/A | 2.080 | 0.518 |
| $m_{final}$ (kg) | N/A | 2.080 | 0.968 |
| Step 9 (E) | | IN | OUT |
| $P_{initial}$ (bar) | 1000 | 31.88 | 142.86 |
| $P_{final}$ (bar) | 1000 | 38.05 | 75.59 |
| $T_{initial}$ (K) | 298.15 | 395.10 | 358.15 |
| $T_{final}$ (K) | 298.15 | 405.24 | 298.15 |
| $m_{initial}$ (kg) | N/A | 2.080 | 0.968 |
| $m_{final}$ (kg) | N/A | 2.414 | 0.634 |
| Step 10 (F) | | OUT | IN |
| $P_{initial}$ (bar) | 1000 | 38.05 | 75.59 |
| $P_{final}$ (bar) | 1000 | 38.05 | 175.37 |
| $T_{initial}$ (K) | 298.15 | 405.24 | 298.15 |
| $T_{final}$ (K) | 298.15 | 405.24 | 358.15 |
| $m_{initial}$ (kg) | N/A | 2.414 | 0.634 |
| $m_{final}$ (kg) | N/A | 2.414 | 1.169 |
| Step 10 (E) | | IN | OUT |
| $P_{initial}$ (bar) | 1000 | 38.05 | 175.37 |
| $P_{final}$ (bar) | 1000 | 45.48 | 92.83 |
| $T_{initial}$ (K) | 298.15 | 405.24 | 358.15 |
| $T_{final}$ (K) | 298.15 | 414.41 | 298.15 |
| $m_{initial}$ (kg) | N/A | 2.414 | 1.169 |
| $m_{final}$ (kg) | N/A | 2.813 | 0.770 |
| Step 11 (F) | | OUT | IN |
| $P_{initial}$ (bar) | 1000 | 45.48 | 92.83 |
| $P_{final}$ (bar) | 1000 | 45.48 | 213.97 |
| $T_{initial}$ (K) | 298.15 | 414.41 | 298.15 |
| $T_{final}$ (K) | 298.15 | 414.41 | 358.15 |
| $m_{initial}$ (kg) | N/A | 2.813 | 0.770 |
| $m_{final}$ (kg) | N/A | 2.813 | 1.398 |
| Step 11 (E) | | IN | OUT |
| $P_{initial}$ (bar) | 1000 | 45.48 | 213.97 |
| $P_{final}$ (bar) | 1000 | 54.33 | 113.29 |
| $T_{initial}$ (K) | 298.15 | 414.41 | 358.15 |
| $T_{final}$ (K) | 298.15 | 422.65 | 298.15 |
| $m_{initial}$ (kg) | N/A | 2.813 | 1.398 |
| $m_{final}$ (kg) | N/A | 3.282 | 0.928 |
| Step 12 (F) | | OUT | IN |
| $P_{initial}$ (bar) | 1000 | 54.33 | 113.29 |
| $P_{final}$ (bar) | 1000 | 54.33 | 259.30 |
| $T_{initial}$ (K) | 298.15 | 422.65 | 298.15 |
| $T_{final}$ (K) | 298.15 | 422.65 | 358.15 |
| $m_{initial}$ (kg) | N/A | 3.282 | 0.928 |
| $m_{final}$ (kg) | N/A | 3.282 | 1.655 |

TABLE 6-continued

Example 3 Process Conditions

| Step 12 (E) | | IN | OUT |
|---|---|---|---|
| $P_{initial}$ (bar) | 1000 | 54.33 | 259.30 |
| $P_{final}$ (bar) | 1000 | 64.76 | 137.32 |
| $T_{initial}$ (K) | 298.15 | 422.65 | 358.15 |
| $T_{final}$ (K) | 298.15 | 430.04 | 298.15 |
| $m_{initial}$ (kg) | N/A | 3.282 | 1.655 |
| $m_{final}$ (kg) | N/A | 3.828 | 1.109 |
| Step 13 (F) | | OUT | IN |
| $P_{initial}$ (bar) | 1000 | 64.76 | 137.32 |
| $P_{final}$ (bar) | 1000 | 64.76 | 311.94 |
| $T_{initial}$ (K) | 298.15 | 430.04 | 298.15 |
| $T_{final}$ (K) | 298.15 | 430.04 | 358.15 |
| $m_{initial}$ (kg) | N/A | 3.828 | 1.109 |
| $m_{final}$ (kg) | N/A | 3.828 | 1.939 |
| Step 13 (E) | | IN | OUT |
| $P_{initial}$ (bar) | 1000 | 64.76 | 311.94 |
| $P_{final}$ (bar) | 1000 | 76.93 | 165.20 |
| $T_{initial}$ (K) | 298.15 | 430.04 | 358.15 |
| $T_{final}$ (K) | 298.15 | 436.70 | 298.15 |
| $m_{initial}$ (kg) | N/A | 3.828 | 19.39 |
| $m_{final}$ (kg) | N/A | 4.455 | 1.311 |
| Step 14 (F) | | OUT | IN |
| $P_{initial}$ (bar) | 1000 | 76.93 | 165.20 |
| $P_{final}$ (bar) | 1000 | 76.93 | 372.39 |
| $T_{initial}$ (K) | 298.15 | 436.70 | 298.15 |
| $T_{final}$ (K) | 298.15 | 436.70 | 358.15 |
| $m_{initial}$ (kg) | N/A | 4.455 | 1.311 |
| $m_{final}$ (kg) | N/A | 4.455 | 2.246 |
| Step 14 (E) | | IN | OUT |
| $P_{initial}$ (bar) | 1000 | 76.93 | 372.39 |
| $P_{final}$ (bar) | 1000 | 90.96 | 197.21 |
| $T_{initial}$ (K) | 298.15 | 436.70 | 358.15 |
| $T_{final}$ (K) | 298.15 | 442.76 | 298.15 |
| $m_{initial}$ (kg) | N/A | 4.455 | 2.246 |
| $m_{final}$ (kg) | N/A | 5.166 | 1.535 |
| Step 15 (F) | | OUT | IN |
| $P_{initial}$ (bar) | 1000 | 90.96 | 197.21 |
| $P_{final}$ (bar) | 1000 | 90.96 | 441.02 |
| $T_{initial}$ (K) | 298.15 | 442.76 | 298.15 |
| $T_{final}$ (K) | 298.15 | 442.76 | 358.15 |
| $m_{initial}$ (kg) | N/A | 5.166 | 1.535 |
| $m_{final}$ (kg) | N/A | 5.166 | 2.573 |
| Step 15 (E) | | IN | OUT |
| $P_{initial}$ (bar) | 1000 | 90.96 | 441.02 |
| $P_{final}$ (bar) | 1000 | 106.98 | 233.51 |
| $T_{initial}$ (K) | 298.15 | 442.76 | 358.15 |
| $T_{final}$ (K) | 298.15 | 448.36 | 298.15 |
| $m_{initial}$ (kg) | N/A | 5.166 | 2.573 |
| $m_{final}$ (kg) | N/A | 5.960 | 1.779 |
| Step 16 (F) | | OUT | IN |
| $P_{initial}$ (bar) | 1000 | 106.98 | 233.51 |
| $P_{final}$ (bar) | 1000 | 106.98 | 518.05 |
| $T_{initial}$ (K) | 298.15 | 448.36 | 298.15 |
| $T_{final}$ (K) | 298.15 | 448.36 | 358.15 |
| $m_{initial}$ (kg) | N/A | 5.960 | 1.779 |
| $m_{final}$ (kg) | N/A | 5.960 | 2.915 |
| Step 16 (E) | | IN | OUT |
| $P_{initial}$ (bar) | 1000 | 106.98 | 518.05 |
| $P_{final}$ (bar) | 1000 | 175.90 | 274.21 |
| $T_{initial}$ (K) | 298.15 | 448.36 | 358.15 |
| $T_{final}$ (K) | 298.15 | 452.76 | 298.15 |
| $m_{initial}$ (kg) | N/A | 5.960 | 2.915 |
| $m_{final}$ (kg) | N/A | 9.426 | 2.039 |
| Step 17 (F) | | OUT | IN |
| $P_{initial}$ (bar) | 1000 | 175.90 | 274.21 |
| $P_{final}$ (bar) | 1000 | 175.90 | 603.59 |
| $T_{initial}$ (K) | 298.15 | 452.76 | 298.15 |
| $T_{final}$ (K) | 298.15 | 452.76 | 358.15 |
| $m_{initial}$ (kg) | N/A | 9.426 | 2.039 |
| $m_{final}$ (kg) | N/A | 9.426 | 3.265 |
| Step 17 (E) | | IN | OUT |
| $P_{initial}$ (bar) | 1000 | 175.90 | 603.59 |
| $P_{final}$ (bar) | 1000 | 180.65 | 319.35 |
| $T_{initial}$ (K) | 298.15 | 452.76 | 358.15 |
| $T_{final}$ (K) | 298.15 | 456.84 | 298.15 |
| $m_{initial}$ (kg) | N/A | 9.426 | 3.265 |
| $m_{final}$ (kg) | N/A | 9.580 | 2.312 |
| Step 18 (F) | | OUT | IN |
| $P_{initial}$ (bar) | 1000 | 180.65 | 319.35 |
| $P_{final}$ (bar) | 1000 | 180.65 | 697.63 |
| $T_{initial}$ (K) | 298.15 | 456.84 | 298.15 |
| $T_{final}$ (K) | 298.15 | 456.84 | 358.15 |
| $m_{initial}$ (kg) | N/A | 9.580 | 2.312 |
| $m_{final}$ (kg) | N/A | 9.580 | 3.261 |
| Step 18 (E) | | IN | OUT |
| $P_{initial}$ (bar) | 1000 | 180.65 | 697.63 |
| $P_{final}$ (bar) | 1000 | 203.67 | 368.92 |
| $T_{initial}$ (K) | 298.15 | 456.84 | 358.15 |
| $T_{final}$ (K) | 298.15 | 461.10 | 298.15 |
| $m_{initial}$ (kg) | N/A | 9.580 | 3.621 |
| $m_{final}$ (kg) | N/A | 10.61 | 2.596 |
| Step 19 (F) | | OUT | IN |
| $P_{initial}$ (bar) | 1000 | 203.67 | 368.92 |
| $P_{final}$ (bar) | 1000 | 203.67 | 700.04 |
| $T_{initial}$ (K) | 298.15 | 461.10 | 298.15 |
| $T_{final}$ (K) | 298.15 | 491.10 | 348.63 |
| $m_{initial}$ (kg) | N/A | 10.61 | 2.596 |
| $m_{final}$ (kg) | N/A | 10.61 | 3.700 |

TABLE 7

Example 4 System Valve States

| Process Step | V1-G | V3-R | V4-R | V1-JT |
|---|---|---|---|---|
| Step 1 (F) | On | 90 | 10 | On |
| Step 1 (E) | On | 10 | 90 | On |
| Step 2 (F) | On | 90 | 10 | On |
| Step 2 (E) | On | 10 | 90 | On |
| Step 3 (F) | On | 90 | 10 | On |
| Step 3 (E) | On | 10 | 90 | On |
| Step 4 (F) | On | 90 | 10 | On |
| Step 4 (E) | On | 10 | 90 | On |
| Step 5 (F) | On | 90 | 10 | On |
| Step 5 (E) | On | 10 | 90 | On |
| Step 6 (F) | On | 90 | 10 | On |

TABLE 8

Example 4 Process Conditions

| Process Step | T1 | T3 |
|---|---|---|
| Step 1 (F) Time: 1.09 s | OUT | IN |
| $P_{initial}$ (bar) | 1000 | 10 |
| $P_{final}$ (bar) | 1000 | 51.00 |
| $T_{initial}$ (K) | 298.15 | 298.15 |
| $T_{final}$ (K) | 298.15 | 358.15 |
| $m_{initial}$ (kg) | N/A | 0.087 |
| $m_{final}$ (kg) | N/A | 0.363 |
| Step 1 (E) Time: 0.56 s | | OUT |
| $P_{initial}$ (bar) | 1000 | 51.00 |
| $P_{final}$ (bar) | 1000 | 25.44 |
| $T_{initial}$ (K) | 298.15 | 358.15 |
| $T_{final}$ (K) | 298.15 | 298.15 |
| $m_{initial}$ (kg) | N/A | 0.363 |
| $m_{final}$ (kg) | N/A | 0.220 |
| Step 2 (F) Time: 2.31 s | OUT | IN |
| $P_{initial}$ (bar) | 1000 | 25.44 |
| $P_{final}$ (bar) | 1000 | 117.25 |
| $T_{initial}$ (K) | 298.15 | 298.15 |
| $T_{final}$ (K) | 298.15 | 358.15 |
| $m_{initial}$ (kg) | N/A | 0.220 |
| $m_{final}$ (kg) | N/A | 0.806 |
| Step 2 (E) Time: 1.22 s | | OUT |
| $P_{initial}$ (bar) | 1000 | 117.25 |
| $P_{final}$ (bar) | 1000 | 58.63 |
| $T_{initial}$ (K) | 298.15 | 358.15 |
| $T_{final}$ (K) | 298.15 | 298.15 |
| $m_{initial}$ (kg) | N/A | 0.806 |
| $m_{final}$ (kg) | N/A | 0.497 |
| Step 3 (F) Time: 4.03 s | OUT | IN |
| $P_{initial}$ (bar) | 1000 | 58.63 |
| $P_{final}$ (bar) | 1000 | 235.29 |
| $T_{initial}$ (K) | 298.15 | 298.15 |
| $T_{final}$ (K) | 298.15 | 358.15 |
| $m_{initial}$ (kg) | N/A | 0.497 |
| $m_{final}$ (kg) | N/A | 1.520 |
| Step 3 (E) Time: 2.19 s | | OUT |
| $P_{initial}$ (bar) | 1000 | 235.29 |
| $P_{final}$ (bar) | 1000 | 118.06 |
| $T_{initial}$ (K) | 298.15 | 358.15 |
| $T_{final}$ (K) | 298.15 | 298.15 |
| $m_{initial}$ (kg) | N/A | 1.520 |
| $m_{final}$ (kg) | N/A | 0.965 |
| Step 4 (F) Time: 5.79 s | OUT | IN |
| $P_{initial}$ (bar) | 1000 | 118.06 |
| $P_{final}$ (bar) | 1000 | 411.11 |
| $T_{initial}$ (K) | 298.15 | 298.15 |
| $T_{final}$ (K) | 298.15 | 358.15 |
| $m_{initial}$ (kg) | N/A | 0.965 |
| $m_{final}$ (kg) | N/A | 2.433 |
| Step 4 (E) Time: 3.28 s | | OUT |
| $P_{initial}$ (bar) | 1000 | 411.11 |
| $P_{final}$ (bar) | 1000 | 206.97 |
| $T_{initial}$ (K) | 298.15 | 358.15 |
| $T_{final}$ (K) | 298.15 | 298.15 |
| $m_{initial}$ (kg) | N/A | 2.433 |
| $m_{final}$ (kg) | N/A | 1.602 |
| Step 5 (F) Time: 7.11 s | OUT | IN |
| $P_{initial}$ (bar) | 1000 | 206.97 |
| $P_{final}$ (bar) | 1000 | 639.76 |
| $T_{initial}$ (K) | 298.15 | 298.15 |
| $T_{final}$ (K) | 298.15 | 358.15 |
| $m_{initial}$ (kg) | N/A | 1.602 |
| $m_{final}$ (kg) | N/A | 3.406 |
| Step 5 (E) Time: 4.23 s | | OUT |
| $P_{initial}$ (bar) | 1000 | 639.76 |
| $P_{final}$ (bar) | 1000 | 322.88 |
| $T_{initial}$ (K) | 298.15 | 358.15 |
| $T_{final}$ (K) | 298.15 | 298.15 |
| $m_{initial}$ (kg) | N/A | 3.406 |
| $m_{final}$ (kg) | N/A | 2.333 |
| Step 6 (F) Time: 5.52 s | OUT | IN |
| $P_{initial}$ (bar) | 1000 | 322.88 |
| $P_{final}$ (bar) | 1000 | 700.05 |
| $T_{initial}$ (K) | 298.15 | 298.15 |
| $T_{final}$ (K) | 298.15 | 344.42 |
| $m_{initial}$ (kg) | N/A | 2.333 |
| $m_{final}$ (kg) | N/A | 3.733 |

TABLE 9

Example 5 System Valve States

| Process Step | V1-G | V3-R | V4-R | VI-JT |
|---|---|---|---|---|
| Step 1 (F) | On | P-On | P-On | On |
| Step 2 (F) | On | P-On | P-On | On |

TABLE 10

Example 5 Process Conditions

| Process Step | T1 | T3 |
|---|---|---|
| Step 1 Time: 10 s | OUT | IN |
| $P_{initial}$ (bar) | 1000 | 10 |
| $P_{final}$ (bar) | 1000 | 39.88 |
| $T_{initial}$ (K) | 273.15 | 298.15 |
| $T_{final}$ (K) | 273.15 | 358.15 |
| $m_{initial}$ (kg) | N/A | 0.087 |
| $m_{final}$ (kg) | N/A | 0.363 |
| Step 2 Time: 60 s | | OUT |
| $P_{initial}$ (bar) | 1000 | 39.88 |
| $P_{final}$ (bar) | 1000 | 700.26 |
| $T_{initial}$ (K) | 273.15 | 358.15 |
| $T_{final}$ (K) | 273.15 | 358.15 |

TABLE 10-continued

Example 5 Process Conditions

| Process Step | T1 | T3 |
|---|---|---|
| $m_{initial}$ (kg) | N/A | 0.363 |
| $m_{final}$ (kg) | N/A | 3.630 |

What is claimed is:

1. A fueling station for a vehicle, the fueling station comprising:
   (a) a fueling station storage tank with an input gate valve and an output gate valve;
   (b) a dispenser comprising an intake line, an output line, a dispenser valve and a controller;
   (c) wherein the dispenser is connected to the fueling station storage tank by the intake line through the station storage tank output gate valve;
   (d) wherein the dispenser is configured for fluidic coupling of the fueling station storage tank to a vehicle storage tank through said first valve;
   (e) a fueling station dumping tank with a dump tank input gate valve and a dump tank output gate valve coupled to the dispenser intake line; and
   (f) a return line configured for connection to the vehicle storage tank through a fuel tank gate valve, the return line fluidly coupled to the fueling station storage tank through the station storage tank input gate valve and to the dumping tank through the dump tank input gate valve;
   (g) wherein said controller is configured to control operation of said gate valves; and
   (h) wherein said controller further comprises a processor and programming executable on the processor for performing steps comprising:
      (i) dispensing fuel to a fuel tank in a vehicle at a first flow rate and for a first period of time;
      (ii) removing fuel from the storage tank at a second flow rate and for a second period of time; and
      (iii) repeating steps (i) and (ii) sequentially to maintain fuel temperature within a desired temperature range and until the vehicle fuel tank is filled to a desired level.

2. The station of claim 1, wherein said dispensing gate valve comprises an isenthalpic (Joule-Thomson) valve.

3. The station of claim 1, further comprising:
   an isenthalpic (Joule-Thomson) valve fluidly coupled to the return line between the vehicle storage tank and the station storage tank input gate valve and the dump tank input gate valve.

4. The station of claim 1, said dispenser further comprising:
   a gas cooler coupled to an output line from the dispensing gate valve;
   wherein gas from the dispenser is cooled before entering the vehicle fuel tank.

5. The station of claim 1, said programming of said controller further comprising:
   stopping the filling of fuel to the vehicle fuel tank when a temperature inside the vehicle fuel tank reaches a maximum allowable temperature.

6. The station of claim 1, said programming of said controller further comprising:
   stopping the removal of fuel from the vehicle fuel tank when a temperature inside of the vehicle storage tank reaches a minimum.

7. The station of claim 1, said programming of said controller further comprising:
   determining the first period of time of dispensing of fuel to the vehicle fuel tank by a set high temperature limit of the fuel inside of the vehicle fuel tank; and
   determining the second period of time for removing fuel from the vehicle fuel tank by a set low temperature limit of the fuel inside of the vehicle fuel tank.

8. The station of claim 1, said programming of said controller further comprising:
   stopping the dispensing of the vehicle fuel tank when the temperature inside the vehicle storage tank reaches a maximum allowable temperature of about 358.15 K; and
   stopping the removal of fuel from the vehicle storage tank is stopped when the temperature inside the vehicle storage tank reaches a minimum of about 298.15 K.

9. The station of claim 1, said programming of said controller further comprising:
   stopping the dispensing of fuel to the vehicle fuel tank when pressure inside the vehicle fuel tank reaches an upper pressure limit and when a temperature inside the vehicle fuel tank is below an upper temperature limit.

10. The station of claim 1, further comprising a compressor configured for connection to the vehicle storage tank.

11. A pressurized gas fueling station for a vehicle, the fueling station comprising:
    (a) a fueling station storage tank;
    (b) a dispenser connected to the fueling station storage tank;
    (c) wherein the dispenser comprises a first valve and a controller;
    (d) wherein the dispenser is configured for fluidic coupling of the fueling station storage tank to a vehicle storage tank through said first valve;
    (e) a fueling station dumping tank connected to the fueling station storage tank through a second valve and configured for connection to the vehicle storage tank through a third valve; and
    (f) a compressor positioned downstream of the dumping tank for increasing pressure of fuel from the dumping tank;
    (g) wherein said controller further comprises a processor and programming executable on the processor for performing steps comprising:
       (i) filling the vehicle storage tank with fuel until temperature of the fuel inside the vehicle storage tank reaches a high temperature limit,
       (ii) emptying the vehicle storage tank into the fueling station dumping tank until the temperature of the fuel inside the vehicle storage tank reaches a low temperature limit, and
       (iii) repeating steps (i) and (ii) until the vehicle storage tank is filled to a desired level.

\* \* \* \* \*